(12) United States Patent
Bernier et al.

(10) Patent No.: US 9,481,370 B2
(45) Date of Patent: Nov. 1, 2016

(54) METHODS AND SYSTEM FOR OPERATION OF VEHICLE

(71) Applicant: BOMBARDIER RECREATIONAL PRODUCTS INC., Valcourt (CA)

(72) Inventors: Michel Bernier, Sherbrooke (CA); Pierre-Luc Milot, Saint-Denis-de-Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/813,347

(22) Filed: Jul. 30, 2015

(65) Prior Publication Data
US 2015/0329117 A1    Nov. 19, 2015

Related U.S. Application Data

(63) Continuation of application No. PCT/US2014/013872, filed on Jan. 30, 2014.

(60) Provisional application No. 61/758,322, filed on Jan. 30, 2013, provisional application No. 61/768,285, filed on Feb. 22, 2013.

(51) Int. Cl.
  *B60W 30/18*    (2012.01)
  *B60W 30/182*   (2012.01)
  *B60W 10/06*    (2006.01)
  *B60W 10/107*   (2012.01)

(52) U.S. Cl.
  CPC .......... *B60W 30/182* (2013.01); *B60W 10/06* (2013.01); *B60W 10/107* (2013.01); *B60W 2510/0642* (2013.01)

(58) Field of Classification Search
  CPC .. B60W 30/18; B60W 30/182; B60W 10/06; B60W 10/107
  See application file for complete search history.

(56) References Cited

U.S. PATENT DOCUMENTS

| | | | |
|---|---|---|---|
| 5,529,041 A * | 6/1996 | Andrews | ................ F02D 41/22 123/436 |
| 5,863,277 A | 1/1999 | Melbourne | |
| 5,975,048 A * | 11/1999 | Sivashankar | ........... F02D 37/02 123/295 |
| 6,414,401 B1 | 7/2002 | Kuroda et al. | |
| 7,104,924 B2 | 9/2006 | Hawkins | |
| 7,702,450 B2 | 4/2010 | Pfohl et al. | |
| 2015/0114343 A1 | 4/2015 | Bernier et al. | |
| 2015/0183321 A1 | 7/2015 | Lefebvre et al. | |

OTHER PUBLICATIONS

International Search Report of PCT/US2014/013872; Shane Thomas; Aug. 4, 2014.

\* cited by examiner

*Primary Examiner* — Hieu T Vo
(74) *Attorney, Agent, or Firm* — BCF LLP

(57) ABSTRACT

A method of operating a vehicle. The vehicle includes an engine. The method including determining if the engine is to be operated at idle and determining a current mode of operation of the vehicle. The current mode of operation is any one of a plurality of modes of operation including at least a first mode and a second mode. The method includes, if the engine is to be operated at idle, operating the engine at a first idle speed if the current mode of operation of the vehicle is the first mode of operation; and operating the engine at a second idle speed if the current mode of operation of the vehicle is the second mode of operation. The first idle speed is greater than the second idle speed.

20 Claims, 14 Drawing Sheets

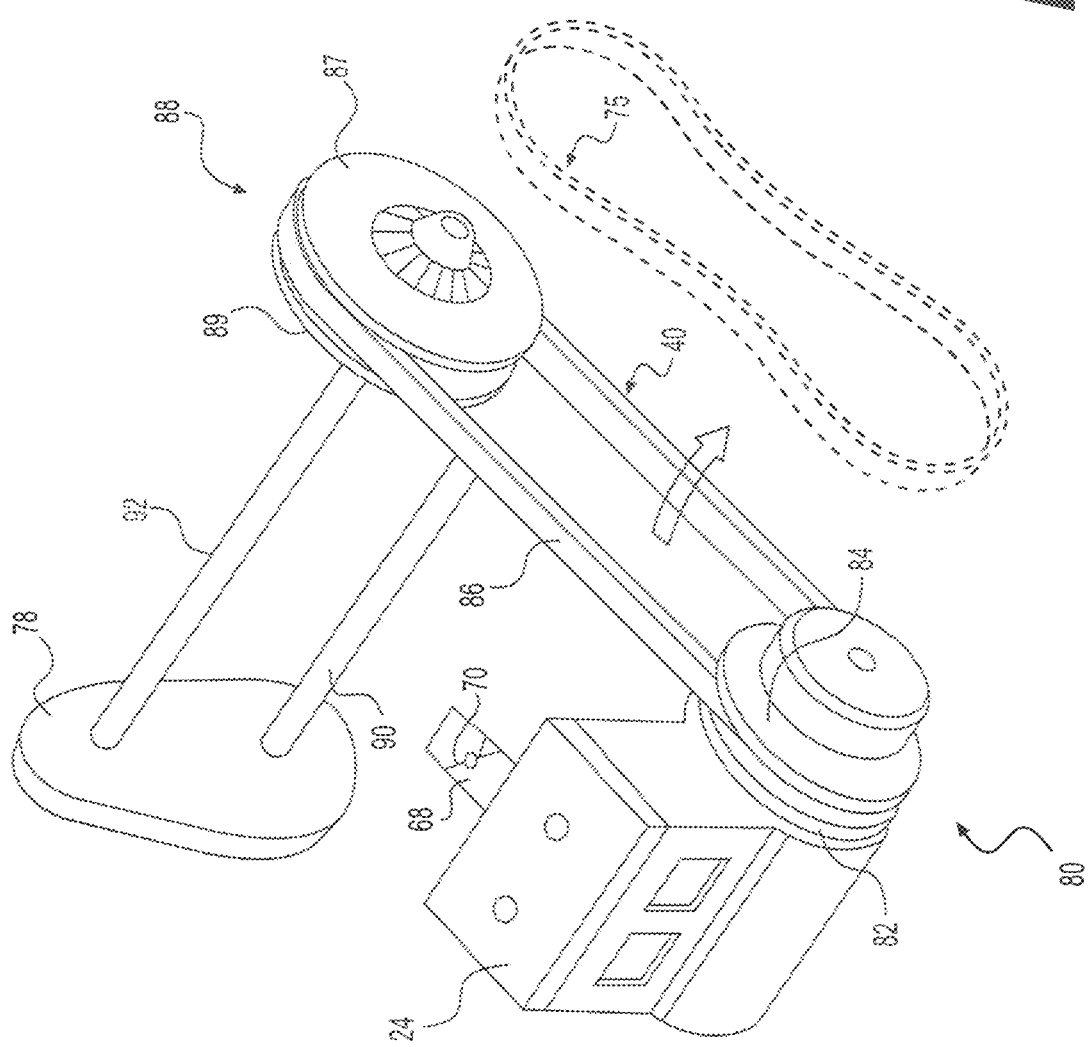

METHODS AND SYSTEM FOR OPERATION OF VEHICLE

CROSS-REFERENCE

The present application is a continuation of International Patent Application No. PCT/US2014/013872 filed on Jan. 30, 2014, the entirety of which in incorporated herein by reference and which claims priority to U.S. Provisional Patent Application No. 61/758,322, filed on Jan. 30, 2013, and U.S. Provisional Patent Application No. 61/768,285 filed on Feb. 22, 2013, the entirety of which are also incorporated herein by reference.

FIELD OF THE INVENTION

The present invention relates generally to methods and systems for operation of vehicle in different modes.

BACKGROUND

Recreational vehicles such as snowmobiles, all-terrain vehicles (ATVs), recreational utility vehicles (RUVs) and the like are operated in different conditions and on different terrains. The vehicles are used for sport, recreation, and utility purposes. Some riders of the vehicles prefer aggressive operation of the vehicle, while others prefer a more relaxed approach. Fuel consumption and noise considerations during operation of the vehicle are also important considerations. These vehicles are often configured to be operable in different modes, each of which optimizes different handling characteristics to satisfy different preferences and needs of the users of the vehicles.

Regardless of the mode of operation being used by the driver, the engine is often required to be operated in "idle", for example, when the vehicle is temporarily stopped. In idle operation, the engine is on but not operatively connected to the ground-engaging member of the vehicles (wheels or tracks as the case may be). The vehicle is thus not being driven by the engine. Typically, the different modes of operating a vehicle are relevant only to the active operation of an engine (i.e. not idle operation). Engine performance is tailored for different operation modes only for its non-idle operation. It would also be desirable to optimize idle operation of an engine for different modes of operation in order to further improve the driving experience.

There is thus a need for a system and method for operating a vehicle in different modes, in both idle and non-idle operation, of the engine.

SUMMARY

It is an object of the present invention to ameliorate at least some of the inconveniences present in the prior art.

In one aspect, the present provides a method of operating a vehicle. The vehicle includes an engine. The method including determining a request for an idle operation of the engine and determining a current mode of operation of the vehicle. The current mode of operation is any one of a plurality of modes of operation including at least a first mode and a second mode. The method includes operating the engine at a first idle speed if the current mode of operation of the vehicle is the first mode of operation; and operating the engine at a second idle speed if the current mode of operation of the vehicle is the second mode of operation. The first idle speed is greater than the second idle speed.

In another aspect, the engine is connected to a throttle body. The throttle body includes a throttle valve. The throttle valve is movable between a plurality of throttle valve positions. Each throttle valve position corresponds to a degree of opening of the throttle valve. Operating the engine at the first idle speed includes operating the engine with a first ignition timing and positioning the throttle valve at a first throttle valve position. Operating the engine at the second idle speed includes operating the engine with a second ignition timing and positioning the throttle valve at a second throttle valve position. The first ignition timing is retarded with respect to the second ignition timing. The degree of opening of the throttle valve corresponding to the first throttle valve position is greater than the degree of opening of the throttle valve corresponding to the second throttle valve position.

In yet another aspect, the engine is operatively connected to a continuously varying transmission (CVT). The CVT has an engagement speed. The first idle speed of the engine is less than the engagement speed. The difference between the first idle speed and the engagement speed is less than the difference between the first idle speed and the second idle speed.

In a further aspect, the method also includes determining a desired mode of operation, the desired mode of operation being any one of the plurality of modes including the first mode and the second mode. The desired mode of operation is compared to the current mode of operation of the vehicle. If the desired mode of operation is different from the current mode of operation of the vehicle, the throttle valve position of the throttle valve is determined and a vehicle speed is determined. The mode of operation of the vehicle is changed from the current mode of operation to the desired mode of operation, based at least in part on the throttle valve position and the vehicle speed.

In an additional aspect, the step of changing the mode of operation includes changing the mode of operation of the vehicle if any one of the following conditions are satisfied: the vehicle speed is greater than a vehicle speed threshold; the throttle valve position is less than a throttle valve position lower threshold; and the throttle valve position is greater than an throttle valve upper threshold.

In another aspect, the method includes indicating to an operator of the vehicle a status update of changing the mode of operation.

In another aspect, the method includes continuing operation of the vehicle in the current mode of operation if all of the following conditions is unsatisfied: the vehicle speed is greater than a vehicle speed threshold, the throttle valve position is less than a throttle valve position lower threshold, and the throttle valve position is greater than an throttle valve upper threshold. The mode of operation of the vehicle is changed from the current mode of operation to the desired mode of operation at a time when any one of the following conditions are satisfied: the vehicle speed is greater than a vehicle speed threshold; the throttle valve position is less than a throttle valve position lower threshold; and the throttle valve position is greater than an throttle valve position upper threshold.

In yet another aspect, the vehicle speed threshold is 10 km/h.

In a further aspect, the throttle valve position lower threshold is 5% of a maximum throttle valve position for the current mode operation of the vehicle.

In an additional aspect, the throttle valve position upper threshold is 86% of a maximum throttle valve position for the current mode operation of the vehicle.

In a further aspect, changing the mode of operation to the desired mode of operation includes changing at least one of: a maximum output power of the engine; a maximum throttle valve position of the throttle valve; and a throttle valve response of the throttle valve position as a function of a throttle operator position.

In another aspect, the maximum throttle valve position of the second mode is one of less than and equal to than the maximum throttle valve position of the first mode.

In yet another aspect, the maximum throttle valve position of the second mode is 50% of the maximum throttle valve position of the first mode.

In an additional aspect, modifying the throttle valve response to the throttle operator position includes modifying a rate of change of the throttle valve position as a function of the throttle operator position.

In a further aspect, the rate of change of the throttle valve position as a function of the throttle operator position is greater in the first mode than in the second mode.

In another aspect, the plurality of modes of operation of the vehicle further includes a third mode of operation. The maximum throttle valve position of the second mode is one of less than and equal to the maximum throttle valve position of the first mode. The maximum throttle valve position of the third mode is less than the maximum throttle valve position of the second mode.

In yet another aspect, the plurality of modes of operation of the vehicle further includes a third mode of operation. The rate of change of the throttle valve position as a function of the throttle operator position is greater in the first mode than in the second mode. The rate of change of the throttle valve position as a function of the throttle operator position is greater in the second mode than in the third mode.

In another aspect, the present provides a method of operating a vehicle having an engine. The method includes determining a current mode of operation of the vehicle, the current mode of operation being any one of a plurality of modes of operation, the plurality of modes of operation including at least a first mode and a second mode. A desired mode of operation is determined, the desired mode of operation being any one of the plurality of modes including the first mode and the second mode. The desired mode of operation is compared to the current mode of operation of the vehicle. If the desired mode of operation is different from the current mode of operation of the vehicle, the throttle operator position is determined. The mode of operation of the vehicle is changed from the current mode of operation to the desired mode of operation if the throttle operator position is greater than a throttle operator lower threshold position.

In another aspect, the present provides a method of operating a vehicle operating a vehicle having an engine. The method includes determining a current mode of operation of the vehicle, the current mode of operation being any one of a plurality of modes of operation, the plurality of modes of operation including at least a first mode and a second mode. A desired mode of operation is determined, the desired mode of operation being any one of the plurality of modes including the first mode and the second mode. The desired mode of operation is compared to the current mode of operation of the vehicle. The mode of operation of the vehicle is changed from the current mode of operation to the desired mode of operation while the throttle operator position is greater than a position corresponding to an idle throttle valve position.

In a further aspect, the method also includes determining a first throttle operator position prior to comparing the desired mode of operation to the current mode of operation of the vehicle, and determining a second throttle operator position after comparing the desired mode of operation to the current mode of operation of the vehicle. The mode of operation of the vehicle is changed from the current mode of operation to the desired mode of operation if the second throttle operator position is greater than the first throttle operator position.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted). The definitions provided herein take precedence over the definitions that may be provided in the document incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 2A is a schematic illustration of a power train of the snowmobile of FIG. 1;

DETAILED DESCRIPTION

Although a snowmobile is being described herein, it should be understood that at least some aspects of the present invention could also be applied to other kinds of vehicles such as, for example, boats, all-terrain vehicles (ATVs), motorcycles, three-wheeled motorized vehicles, and the like.

Figure 1:
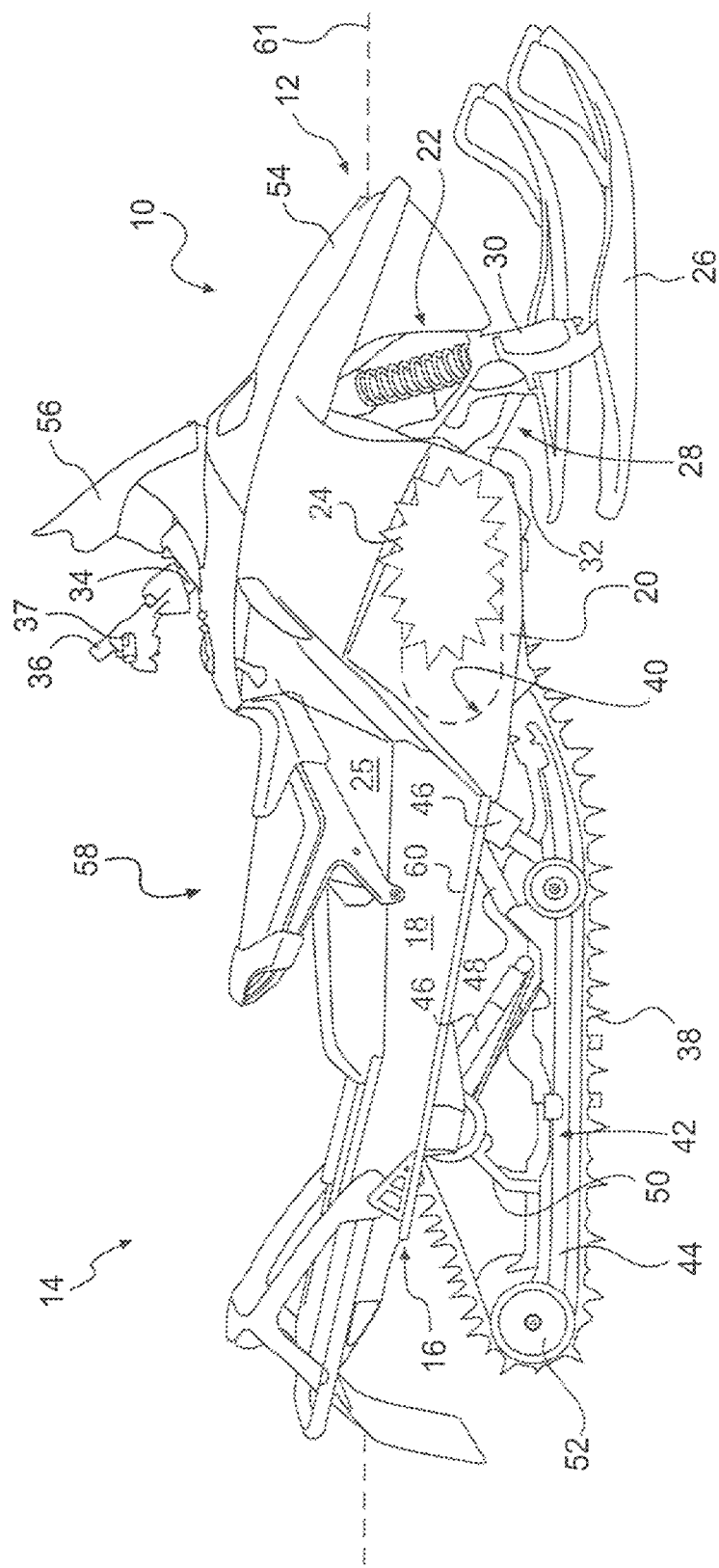
FIG. 1 is right side elevation view of a snowmobile.

Referring to FIG. 1, a snowmobile 10 includes a forward end 12 and a rearward end 14 which are defined consistently with a travel direction of the vehicle. The snowmobile 10 includes a vehicle body in the form of a frame or chassis 16 which includes a rear tunnel 18, an engine cradle portion 20 and a front suspension assembly portion 22.

An engine 24, which is schematically illustrated in FIG. 1, is carried by the engine cradle portion 20 of the frame 16. The engine 24 drives an engine output shaft (not shown) that rotates about a horizontally disposed axis extending generally transversely to a longitudinal centerline 61 of the snowmobile 10. A fuel tank 25, supported above the tunnel 18, supplies fuel to the engine 24 for its operation. An engine control unit (ECU) 200 (FIG. 3) is operatively connected to the engine 24 to control operation of the engine 24 as will be discussed below.

Two skis 26 positioned at the forward end 12 of the snowmobile 10 are attached to the front suspension assembly portion 22 of the frame 16 through a front suspension assembly 28. The front suspension assembly 28 includes ski legs 30, supporting arms 32 and ball joints (not shown) for operatively joining the respective ski legs 30, supporting arms 32 and a steering column 34.

An endless drive track 38 is positioned at the rear end 14 of the snowmobile 10. The drive track 38 is disposed generally under the tunnel 18, being connected operatively to the engine 24 through a belt transmission system 40 which is schematically illustrated by broken lines in FIG. 1. The engine output shaft drives the transmission system 40 for transmitting torque to the endless drive track 38 for propulsion of the snowmobile 10. The transmission 40 is a continuously variable transmission (CVT) 40 but it is contemplated that other kinds of transmissions could also be used. The endless drive track 38 is driven to run about a rear suspension assembly 42 for propulsion of the snowmobile 10.

The rear suspension assembly 42 includes a pair of slide rails 44 in sliding contact with the endless drive track 38. The rear suspension assembly 42 also includes one or more shock absorbers 46 which may further include a coil spring (not shown) surrounding the individual shock absorbers 46. Front and rear suspension arms 48 and 50 are provided to attach the slide rails 44 to the frame (chassis) 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. A windshield 56 connected to the fairings 54 acts as a wind screen to lessen the force of the air on the rider while the snowmobile 10 is moving.

A straddle-type seat 58 is positioned atop the fuel tank 25 and extends rearward from the fairings 54 to accommodate a driver of the snowmobile 10. A rear portion of the seat 58 may include a storage compartment or can be used to accommodate a passenger seat (not indicated). A footrest 60 is positioned on each side of the snowmobile 10 below the seat 58 to accommodate the driver's feet.

The upper end of the steering column 34 is attached to a steering device such as a handlebar 36 which is positioned forward of the seat 58. The handlebar 36 is used to rotate the ski legs 30 and thus the skis 26, in order to steer the vehicle 10. A throttle operator 37 in the form of a finger-actuated throttle lever 37 is mounted to the handlebar 36. Other types of throttle operators, such as a thumb-actuated throttle lever and a twist grip, are also contemplated. The throttle lever 37 is normally biased, typically by a spring, towards a position furthest away from the handlebar 36. This position of the throttle lever 37 is indicative of a desire for an idle operation of the engine 24 as will be described below. The throttle lever 37 can be pressed towards the handlebar 36 to increase air flow into the engine 24, and to thereby increase the output power of the engine 24 by means of a drive-by-wire (DBW) system. U.S. Provisional Patent Application No. 61/666,443, filed on Jun. 29, 2012, the entirety of which is incorporated herein by reference, provides additional details of drive-by-wire throttle systems in vehicles. A throttle operator position PP is defined as a fraction of its fully activated position and thus varies between 0% (unactivated or idle position) and 100% (fully activated when throttle lever 37 is at its closest position to the handlebar 36). A brake actuator 39, in the form of a hand brake lever 46, is provided on the left side of the handlebar 36 for braking the snowmobile 10 in a known manner.

A display cluster 64 (FIG. 3) is provided in front of the handlebars 36 to display information, such as the vehicle speed, engine speed, vehicle mode, temperature and the like, to the driver of the snowmobile 10. The display cluster 64 possibly includes one or more gauges, display screens, indicator lights and sound output devices such as speakers, alarms and the like.

A mode switch 62 (FIG. 3) is provided near or on the handlebar 62. The mode switch 62 is in the form of a toggle switch, but it is contemplated that it could be a push-button switch, knob, lever or other user control implemented into the display cluster 64 or gauges. The mode switch 62 has positions corresponding to an economy mode, a standard mode and a sport mode, as will be described below in further detail. The mode switch 62 can be toggled sequentially through the positions corresponding to the economy mode, the standard mode, and the sport mode. The driver of the snowmobile 10 indicates a desire to change the mode of operation from a current mode of operation CM to a desired mode of operation DM for the snowmobile 10 by actuating the mode switch 62 to the position corresponding to the desired mode DM. The operation of the snowmobile 10 is changed from a current mode of operation CM to the desired mode DM in accordance with methods described in further detail below. It is contemplated that the number and names of operation modes could be different than as described herein.

The snowmobile 10 also includes an engine cut-off switch 216 (FIGS. 3 and 7A) connected to the ECU 200 for turning off the engine 24. The engine cut-off switch 216, in the form of a push-pull button switch, extends upwards from the right side of the handlebar 36. The position of the engine cut-off switch 216 close to the right hand grip of the handlebar 36 enables the snowmobile driver to easily reach the engine cut-off switch 216 and to operate it to stop engine operations. The ECU 200 may terminate engine operation by preventing current flow to either the fuel pump or the fuel injectors to deprive the engine 24 of fuel, or it may stop current flow to the spark plugs to prevent fuel combustion in the engine 24. It is also contemplated that the ECU 200 may use two or more of these methods concurrently to stop snowmobile motion and/or engine operation. Other methods of preventing movement of the snowmobile 10 may be apparent to a person skilled in the art, and any of these other methods are considered to be within the scope of the present invention.

A start-up switch 220 (FIGS. 3 and 7A), in the form of a push-button, is located on the left side of the handlebar 37 near the brake lever 39. The driver indicates a desire to start-up the engine 24 by actuating the start-up switch 220, i.e. by pushing the start-up switch 220 to an "ON" position. In the illustrated embodiment of the snowmobile 10, the snowmobile 10 has a starter motor (not shown) for starting the engine 24. The starter motor, when activated, selectively engages a flywheel connected to a crankshaft (not shown) of the engine 24 and thereby rotates the crankshaft to start the engine 24. It is contemplated that the starter motor could be omitted and a starter cord could be connected to the flywheel to rotate the crankshaft and start operation of the engine 24. Thus, instead of pushing a button, the driver could pull a cord to start-up the engine 24.

Figure 3:
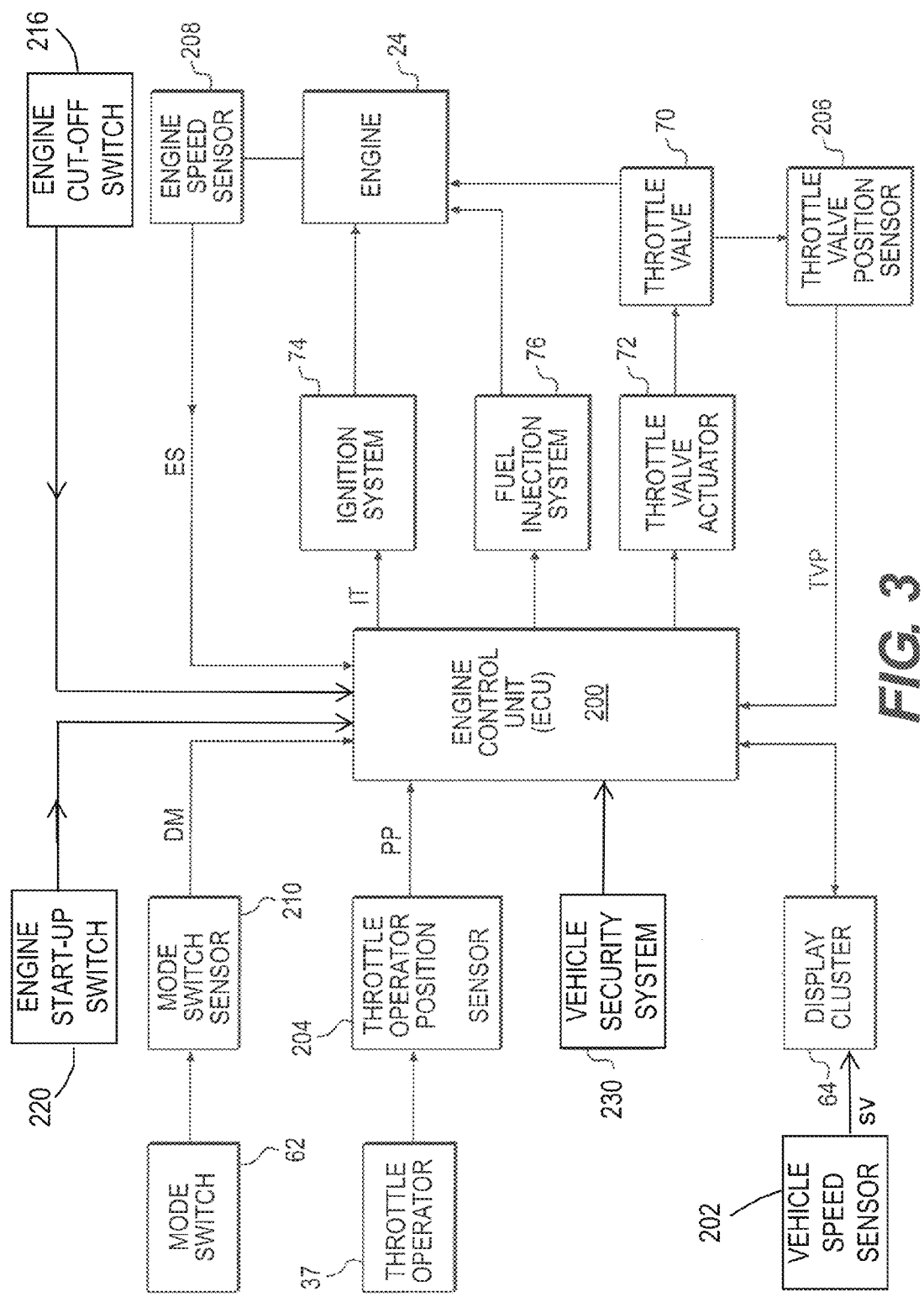
FIG. 3 is a schematic illustration of elements of an engine control unit of the snowmobile of FIG. 1.
Figure 7A:
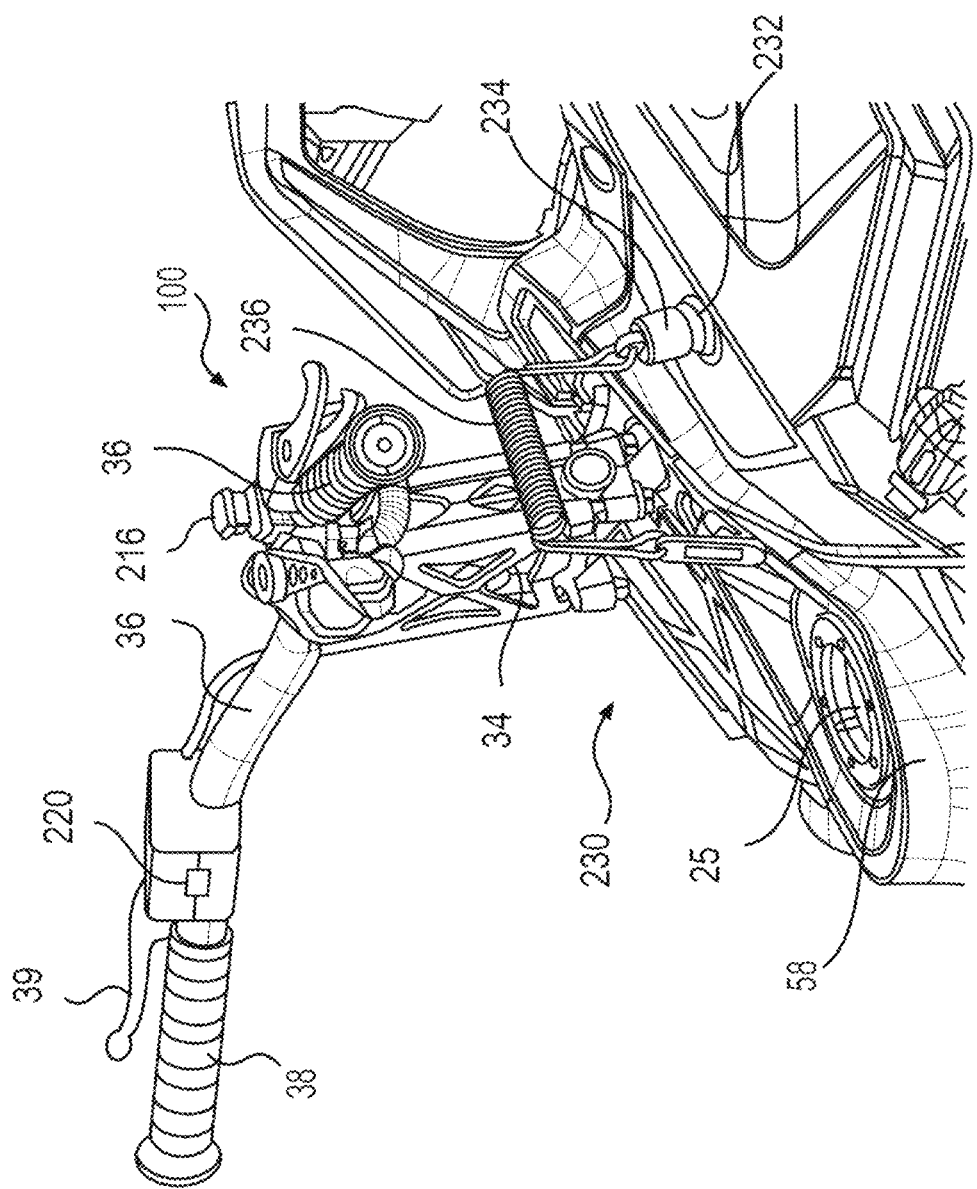
FIG. 7A is a close-up perspective view, taken from a rear, right side of the snowmobile of FIG. 1, showing a security system thereof.
Figure 7B:
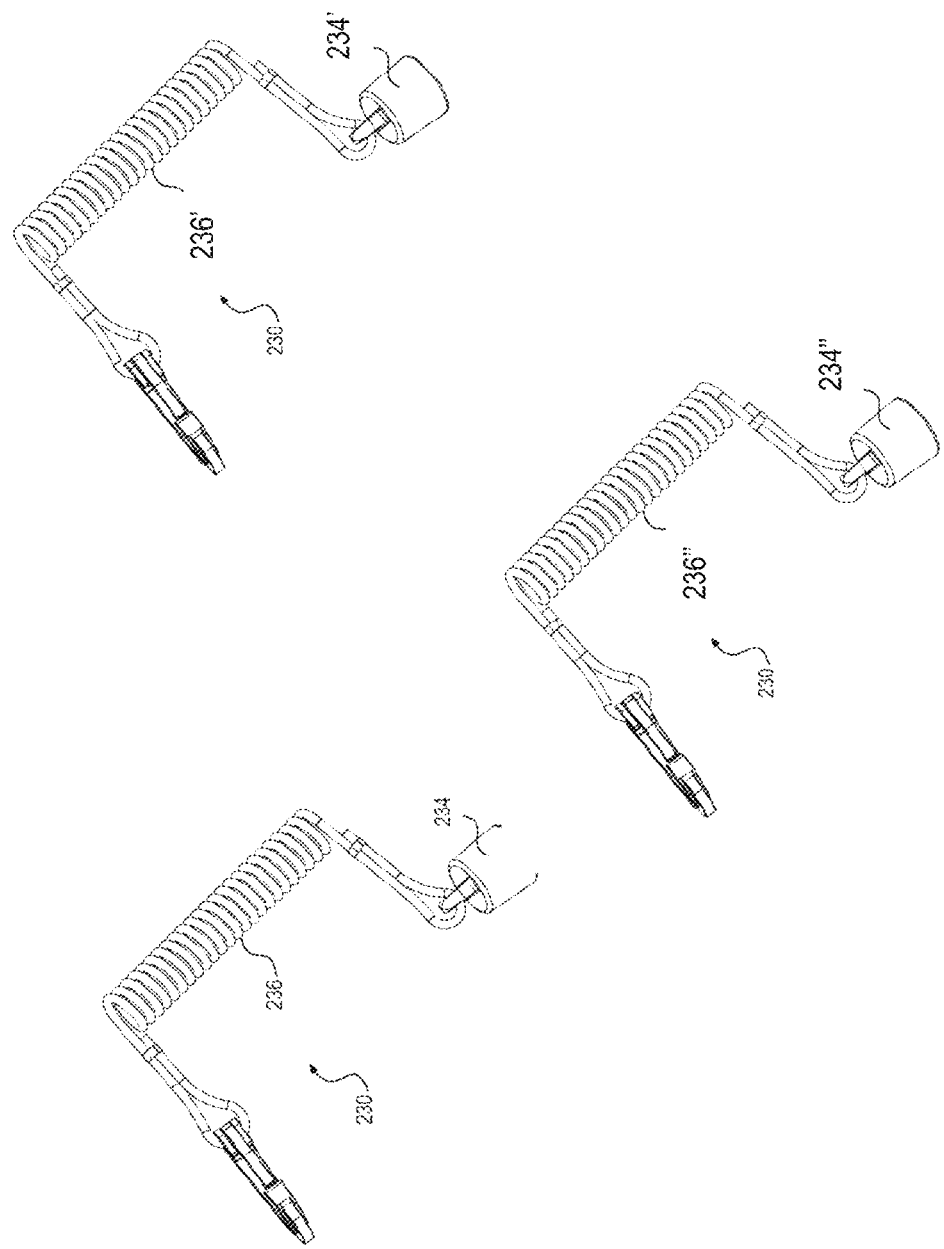
FIG. 7B is a side elevation view of a standard key and two learning keys of the security system of FIG. 7A.

With reference to FIGS. 3, 7A and 7B, the snowmobile 10 is provided with a security system 230 such as, for example, Bombardier Recreation Product's Digitally Encoded Security System (DESS™). The security system 230 includes a key receiver 232 and a key 234 tied to a lanyard 236 as can be seen in FIG. 7A. The key receiver 232 is in the form of a cylinder positioned in front of the seat 58 on the right side of the upper end of the steering column 34 and below the right side handlebar 36. The cup-shaped key 234 fits over the key receiver 232. The key 234 includes a magnet and a digitally encoded chip containing identification information. The lanyard 136 is intended to be clipped to the driver of the snowmobile 10. If the snowmobile driver leaves the snowmobile 10, the key 234 fastened to the snowmobile driver by the lanyard 236, disengages from the key receiver 232. The engine 24 and other systems are deactivated when the security system key 234 is removed from the key receiver 232. The security system 230 thus also serves as a safety system for the snowmobile 10 terminating operation of the snowmobile 10 if the snowmobile driver is separated from the snowmobile 10 during operation. Thus, the engine 26 and other systems of the snowmobile can be turned on or activated only if the key 134 is coupled to, or installed on, the key receiver 132. The engine 26 is operable only when an authorized security system key 134 is installed on the key receiver 132, the engine cut-off switch 116 is an "OFF" position or deactivated, and the start-up switch 120 is in an "ON" position. The security system 230 is described in detail in co-pending International Patent Application Publication No. WO2014/005130, the entirety of which is incorporated herein by reference.

FIG. 2A illustrates schematically a powertrain 75 of the snowmobile 10. The powertrain 75 includes the engine 24, the CVT 40 and a fixed-ratio reduction drive 78. The CVT 40 includes a drive pulley 80 coupled directly to the engine output shaft and a driven pulley 88 coupled to one end of a transversely mounted jackshaft 92 which is supported on the frame 16 by bearings. A CVT belt 86, disposed around both pulleys 80, 88, transmits torque from the drive pulley 80 to the driven pulley 88. The opposite end of the transversely mounted jackshaft 92 is connected to the input member of the reduction drive 78 and the output member of the reduction drive 78 is connected to a drive axle 90 carrying sprocket wheels (not shown) that form a driving connection with the drive track 38.

In this particular embodiment, the drive pulley 80 rotates at the same speed ES as the output shaft of the engine 24 whereas the speed of rotation of the transverse jackshaft 92 is determined in accordance with the instantaneous ratio of the CVT 40. The drive axle 90 rotates at a lower speed than the transverse jackshaft 92 because of the action of the reduction drive 78. It is contemplated that the driven pulley 88 could be coupled to a shaft other than the transverse jackshaft 92, such as directly to the drive axle 90 or any other shaft operatively connected to the ground engaging element of the vehicle 10 (i.e. the drive track 38 in the case of the snowmobile 10 illustrated herein).

Each of the pulleys 80, 88 includes a movable sheave that can move axially relative to a fixed sheave to modify an effective diameter of the corresponding pulley 80, 88. The drive pulley sheaves are biased away from each other so that when not rotating, the drive pulley sheaves are far apart and the belt 86 is disengaged from the drive pulley 80. The moveable sheave moves in response to changes in engine speed ES. The effective diameters of the pulleys 80, 88 are in inverse relationship. In the illustrated embodiment, the CVT 40 is a purely mechanical CVT 40, in which the effective diameter of the drive pulley 80 depends only on the engine speed ES. As the engine output shaft and the drive pulley sheaves begin to rotate with increasing rotational speeds ES, the separation between the drive pulley sheaves decreases due to the action of a set of centrifugal weights pushing the moveable sheave towards the fixed sheave. At a certain engine speed ES, the drive pulley sheaves engage the belt 86 which in turn begins to rotate the driven pulley sheaves. The rotational speed ES (of the engine output shaft and drive pulley sheaves) at which the drive pulley sheaves engage the belt 86 is referred to as the engagement speed $ES_{engage}$. It is also contemplated that the CVT 40 could be an assisted CVT having a hydraulic, pneumatic, or other system to control the effective diameter of the pulleys 80 or 88, and thus, the engagement speed $ES_{engage}$ of the CVT 40.

For rotational speeds ES greater than the engagement speed $ES_{engage}$, the engine 24 is operatively connected via the CVT 40 to the track 38. For rotational speeds ES less than the engagement speed $ES_{engage}$, the CVT 40 is not engaged and thus the powertrain 75 cannot deliver torque and power from the engine 24 to the tracks 38. The snowmobile 10 is thus not being driven by the engine 24, and the engine 24 is in idle operation for engine speeds ES less than the engagement speed $ES_{engage}$. Idle operation of the engine 24 enables powering of vehicle systems such as the displays 64, the ECU 200, and the like. The engine 24 can be placed in idle operation by releasing the throttle lever 37 without turning off the engine 24. The engine 24 is typically turned on and off by inserting a key (mechanical and/or electronic) into a key receiver or by the operation of an on/off switch.

The engine 24 is an inline, two-cylinder, four-stroke, internal combustion engine. It is however contemplated that the construction of the engine 24 may be of any known type. The engine 24 receives fuel from the fuel tank 25 via a fuel injection system 76 (FIG. 3). The engine 24 receives air from an air intake system 66 (FIG. 2B) via a throttle body 68. The fuel-air mixture in the engine 24 is ignited by an ignition system 74. Engine output power P, torque τ and engine speed ES are determined in part by the fuel-air mixture in the engine 24 and the ignition timing IT. An engine control unit (ECU) 200 is operatively connected to the engine 24 to control operation of the engine 24 as will be discussed below.

Figure 2B:
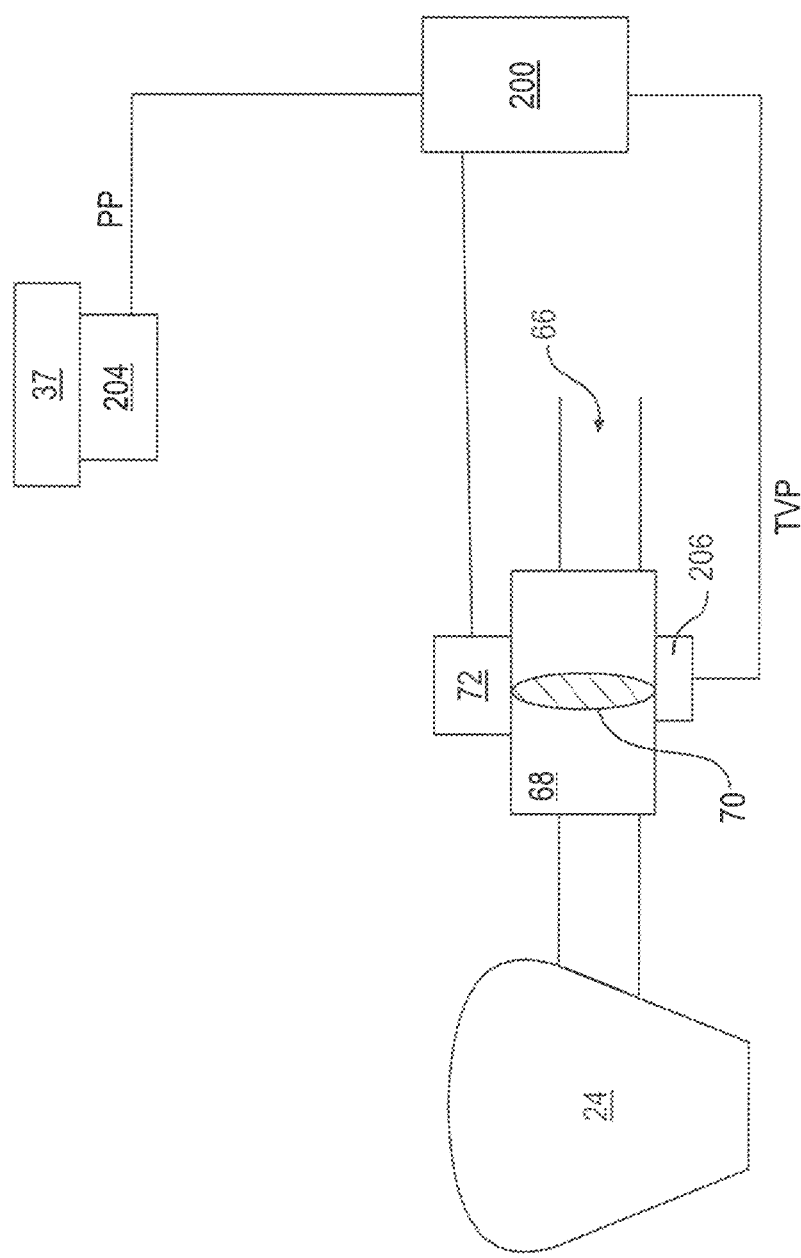
FIG. 2B is a schematic illustration of a throttle control system of the snowmobile of FIG. 1.

With reference to FIG. 2B, the throttle body 68 comprises a throttle valve 70 that regulates the amount of air flowing through the throttle body 68 into the engine 24. The throttle valve 70 is a butterfly valve comprising a circular disc mounted inside the tubular throttle body 68 that rotates about a rod passing through a diameter of the disc. The passage of air through the tubular throttle body 68 is obstructed by varying amounts as the disc rotates about the rod. The throttle valve 70 is in a fully open position (minimal obstruction of air flow) when the circular surface of the disc is at its minimum angle with respect to the central axis of the tubular throttle body 68, and in a fully closed position (maximal obstruction of air flow) when the circular surface of the disc is at its maximum angle with respect to the central axis of the tubular throttle body 68. A throttle valve actuator 72, in the form of an electric motor, is operatively connected to the throttle plate to change the position of the throttle plate and thereby adjust the opening of the throttle valve 70. A throttle valve position TVP can be defined in terms of a degree of opening of the throttle valve 70. The throttle valve position TVP is defined as a fraction of its fully open position and thus varies from 0% (fully closed) to 100% (fully open). A throttle valve sensor 206 is connected to the throttle valve 70 to sense the throttle valve position TVP. The throttle valve actuator 72 positions the throttle valve 70 based at least in part on a position PP of the throttle lever 37 of the snowmobile 10. As mentioned above, the snowmobile 10 has a drive-by-wire (DBW) system in which the throttle valve 70 is controlled electronically instead of having a mechanical linkage between the throttle lever 37 and the throttle valve 70. The position PP of the throttle lever 37 is monitored by a throttle operator position sensor 204. The actuator 72 is controlled based in part on signals received from the ECU 200, as described below.

With reference to FIGS. 2B and 3, the ECU 200 is in electronic communication with various sensors from which it receives signals. The ECU 200 uses these signals to control the operation of the throttle valve actuator 72, the ignition system 74, and the fuel injection system 76 in the case of a fuel injected engine, in order to control the engine 24. The methods by which the ECU 200 controls the engine 24 will be described in more detail below.

As it would be understood by those skilled in the art, not every sensor or component illustrated in FIG. 3 is required to achieve aspects of the present invention. As would also be understood by those skilled in the art, depending on the particular aspect of the invention, some of the sensors and components could be omitted, some of the sensors and components could be substituted by other types of sensor and components, and two or more sensors could be combined in a single sensor that can be used to perform multiple functions without departing from the scope of the present invention.

The throttle operator position sensor 204 senses a position PP of the throttle operator 37 (finger or thumb actuated throttle lever 37 in the illustrated embodiment of the snowmobile 10) and sends a signal representative of the throttle operator position PP to the ECU 200. Depending on the type of throttle operator, the throttle operator position sensor 204 is generally disposed in proximity to the throttle operator 37 and senses the movement of the throttle operator 37 or the linear displacement of a cable connected to the throttle operator 37.

The ECU 200 sends a signal to the throttle valve actuator 72 to adjust the position TVP, and thereby the opening, of the throttle valve 70 inside the throttle body 68. The throttle valve position TVP is adjusted based in part on the throttle operator position PP as well as on other factors such as the ignition timing IT, required output power P and torque τ, the current mode of operation CM, and the like.

The throttle valve position sensor 206 senses the position (i.e. the degree of opening) of the throttle valve 70 and sends a signal representative of the position TVP of the throttle valve 70 to the ECU 200. The throttle valve position sensor 206 acts as a feedback to the ECU 200 since the ECU 200 uses the signal received from the throttle valve position sensor 206 to determine if the throttle valve actuator 72 has moved the throttle valve 37 to the desired position and can make adjustments accordingly. The throttle valve position sensor 206 can be any suitable type of sensor such as a rheostat, hall-effect sensor, potentiometer, and the like. Depending on the type of throttle valve actuator 72 being used, a separate throttle valve position sensor 206 may not be necessary. For example, a separate throttle valve position sensor 206 would not be required if the throttle valve actuator 72 is a servo motor since servo motors integrate their own feedback circuit that corrects the position of the motor and thus have an integrated throttle valve position sensor 206.

An engine speed sensor 208 senses a speed of rotation ES of the engine 24 and sends a signal representative of the speed of rotation ES of the engine 24 to the ECU 200. The engine speed sensor 208 is a hall-effect type sensor coupled to a trigger wheel on the engine output shaft. It is contemplated that the engine speed sensor 202 could be coupled to any rotating shaft of the engine 24, such as the crankshaft. The rotation speed ES of the engine 24 can be used by the ECU 200 to calculate the engine torque τ and the power output P of the engine 24.

A mode switch sensor 210 senses a position or a movement of the mode switch 62 and sends a signal to the ECU 200 indicative of the desired mode of operation DM. In some embodiments, the mode switch sensor 210 is configured to sense a position of the mode switch 62 and the ECU 200 determines the corresponding desired mode of operation DM from the signal received from the mode switch sensor 210. In some embodiments, the mode switch sensor 210 is configured to sense a movement of the mode switch 62, including the number of steps moved (one or two steps in the illustrated embodiment) and a direction of movement ("up" or "down"). The mode switch sensor 210 sends a signal to the ECU 200 indicative of the movement and the ECU 200 determines the desired mode of operation DM based on the current mode of operation CM and the information received about the movement of the mode switch 62.

A vehicle speed sensor 202 senses the speed VS of the snowmobile 10 and sends a signal representative of the speed VS of the snowmobile 10 to the cluster 64. It is contemplated that the vehicle speed sensor 202 could also send a signal representative of the speed VS of the snowmobile 10 to the ECU 200. The vehicle speed sensor 202 is a hall-effect sensor coupled to a trigger wheel on a driveshaft, such as the drive axle 90 or the jackshaft 92 so as to sense a rotational speed thereof. It is contemplated that the vehicle speed sensor 202 could sense a speed of any shaft driven by the driven pulley 88 (i.e. any shaft connected between the driven pulley 88 and the track 38), including shafts inside the reduction drive 78, to determine the speed of the snowmobile 10. It is contemplated that any suitable type of vehicle speed sensor 202 could be used. Alternatively, the vehicle speed sensor 202 could include a global positioning system (GPS unit). By using information from the GPS unit, the speed of the vehicle 10 can be determined by calculating a change in position of the vehicle 10 over a period of time which is normally a function of the GPS unit.

The ECU 200 is connected to the ignition system 74 to control ignition of the fuel-air mixture in the combustion chamber of the engine 24. For example, the ECU 200 controls the ignition timing IT based partly on the throttle valve position TVP, the throttle operator position PP, and/or engine speed ES. The ECU 200 is also connected to the fuel injection system 76 to control fuel injection into the engine 24.

The ECU 200 is connected to the display cluster 64 to control display of information thereon. The ECU 200 sends signals to the display cluster 64 to display information regarding engine and vehicle speed, and mode selection.

The ECU 200 is connected to the engine cut-off switch 216 to determine if engine operations need to be terminated.

The ECU 200 is connected to the start-up switch 220 to determine when the driver desires to commence operation of the engine 24.

The ECU 200 is connected to the security system 230 to verify that the driver is authorized to operate the snowmobile 10, and to terminate vehicle and/or engine operation in the event of an emergency. As will be discussed below, the ECU 200 can also obtain information for operation of the snowmobile 10 from the security system.

It is contemplated that the ECU 200 could be separated into multiple units each having one or more of the functions described above and further below.

The ECU 200 controls operation of the engine 24 based at least in part on the signals received from the sensors 202, 204, 206, 208, 210 and depending on the specific control scheme or map being used by the ECU 200. The control maps provide information related to various parameters (such as throttle valve position, throttle operator position, fuel injection, ignition timing, engine torque, power output, etc.) needed for operation of the engine 24. For example, a control map could provide information regarding the variation of throttle valve position and engine speed for achieving a particular power output or engine torque. The ECU 200 may also use algorithms, in addition to the control maps, to determine some of the parameters.

The snowmobile 10 can be operated in different modes of operation (sport, standard and economy in the illustrated embodiment) as mentioned above. Some of the control maps used by the ECU 200 are specific to each mode of operation and specify the variation of engine parameters for operation in that mode.

Figure 6A:
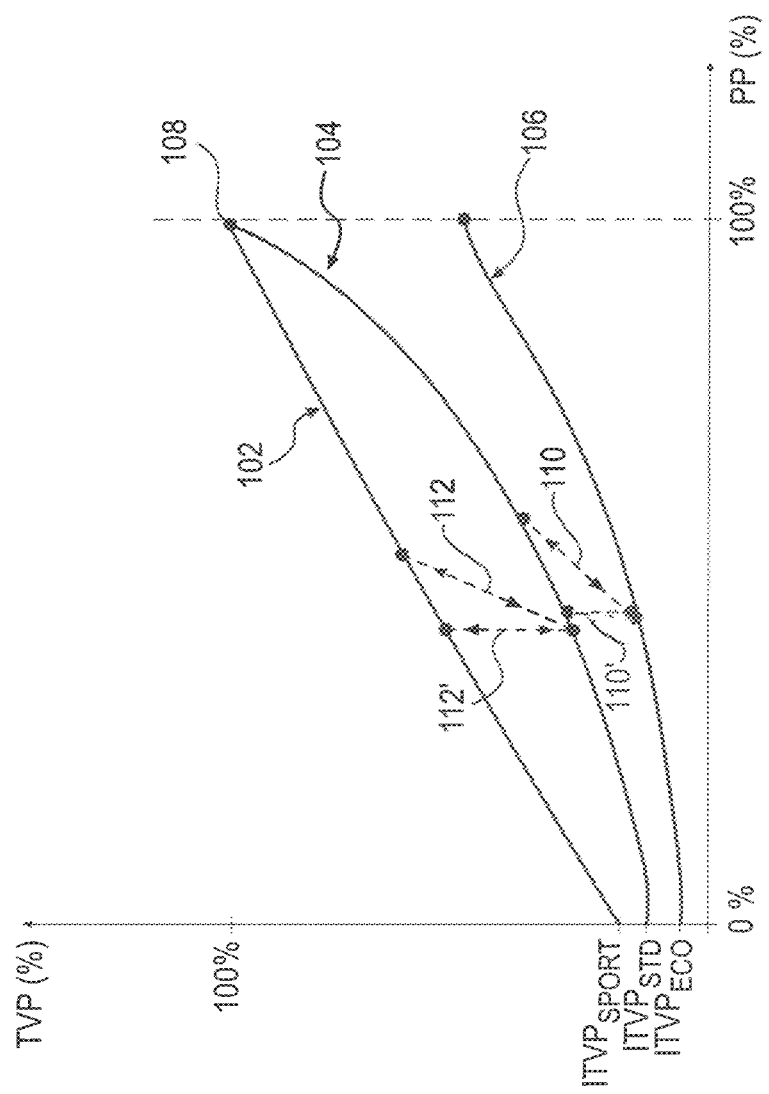
FIG. 6A is an illustration of the response of a throttle valve to a position of a throttle operator in different modes of operation of the snowmobile of FIG. 1.

With reference to FIG. 6A, it can be seen that the throttle response (i.e. the throttle valve position TVP as a function of throttle operator position PP) is different for different modes. As mentioned above, the throttle valve position TVP is defined as a fraction of its fully open position and thus varies from 0% (fully closed) to 100% (fully open). The throttle operator position PP is also defined as a fraction of its fully activated position and thus varies between 0% (unactivated or idle) and 100% (fully activated).

As the throttle operator position PP increases from 0% to 100%, the corresponding throttle valve position TVP for each mode increases from a minimum value for that mode to a maximum value for that mode. The minimum throttle valve position TVP corresponding to the 0% throttle operator position PP is greater than zero for all three modes. It is contemplated that the throttle valve position TVP corresponding to the 0% throttle operator position PP could be zero for all three modes. The minimum throttle valve position TVP corresponds to the idle throttle valve position ITVP for that mode and is set at a value greater than zero to enable idle operation in that mode as will be discussed below.

As can be seen, for any given throttle operator position PP, the corresponding economy mode throttle valve position TVP is lower than the corresponding sport and standard mode throttle valve positions TVP. Furthermore, for any given throttle operator position PP other than 100%, the sport mode throttle valve position TVP is greater than the corresponding standard mode throttle valve position TVP. At the 100% throttle operator position PP the sport and standard mode throttle valve positions TVP are equal.

In the illustrated embodiment, the maximum throttle valve position TVP in the sport and standard modes is set to be at its fully open position (i.e. at 100%), while in the economy mode, the maximum throttle valve position TVP is limited to 50% of its fully open position. It is contemplated that the maximum throttle valve position TVP of the standard mode could be less than that of the sport mode such that the each of the three modes has a different maximum throttle valve positions TVP. It is also contemplated that the maximum throttle valve position TVP of the standard mode could be the same as that of the economy mode. In the illustrated embodiment, for each of the three modes, the maximum throttle valve position TVP is obtained when the throttle pedal 37 is positioned at its maximum throttle position PP of a 100%. It is contemplated that the maximum throttle valve position TVP could be obtained for a throttle operator position which is less than 100%.

The engine 24 of the snowmobile 10 is capable of delivering a certain maximum output power based on its capacity as will be understood by a worker skilled in the art. The power P delivered by the engine 24 at any given instant is a function of, amongst other parameters, the throttle valve position TVP, the ignition timing IT and the fuel injection. The ECU 200 controls operation of the engine 24 such that the output power P delivered by the engine 24 also depends on the current mode of operation CM. For example, in the economy mode, the output power P delivered by the engine 24 is limited to a maximum value that is approximately 50% of the maximum output power available from the engine 24.

Furthermore, idle operation of the engine 24 is also controlled based on the current mode of operation CM of the engine 24. The engine 24 is operated at an idle engine speed IES which is different for different modes. The idle throttle valve position ITVP and idle ignition timing IIT are also set at different values in different modes to obtain different CVT-engagement characteristics in each mode.

The idle engine speed IES in-part determines the response time for transitioning from idle operation ($IES<ES_{engage}$ and PP=0%) to active operation ($ES>ES_{engage}$ and PP>0%). The response time is defined as the time lapsed between the instant when the throttle lever 37 is actuated (increased from PP=0) and the instant when the CVT 40 engages thereby connecting the engine 24 to the endless tracks 38. Idle speeds in the sport, standard and economy modes, respectively labelled $IES_{SPORT}$, $IES_{STD}$ and $IES_{ECO}$, are thus set so as to provide the desired response time for that mode of operation. For example, a smaller response time is desirable in the sport mode than in the standard and economy modes of operation for a similar actuation of the throttle lever 37 from a throttle lever position PP=0% to a throttle lever position PP>0%.

In general, the response time is smaller for idle engine speeds IES closer to the engagement speed $ES_{engage}$. Therefore, the idle engine speed $IES_{SPORT}$ of the sport mode is set closer (relative to $IES_{STD}$ and $IES_{ECO}$) to the engagement speed $ES_{engage}$ in order to ensure that the slightest movement of the throttle lever 37 will cause the CVT 40 to engage, providing a "sporty" or high performance experience to the driver of the snowmobile 10.

A given idle engine speed IES can be obtained with different combinations of idle throttle valve position ITVP and idle ignition timing IIT. In general, the engine speed ES can be increased either by advancing the ignition timing IT or by increasing the throttle valve position TVP.

The response time for transitioning from idle operation to active operation is also dependent on the idle throttle valve position ITVP and idle ignition timing IIT selected to obtain a given idle engine speed IES as these parameters influence the response time differently. The ignition timing IT and the throttle valve position TVP can each be changed very rapidly. However, the rate of change of the engine speed ES is much greater in response to a change in ignition timing IT than in response to a change in the throttle valve position TVP due to the large volume of air in the induction system of the snowmobile 10. In general, the effect of changing the TVP on the engine speed ES is smaller for greater volumes of air in the induction system. A change of engine speed ES can therefore be obtained much faster by varying the ignition timing IT than by varying the throttle valve position TVP.

The transition from idle operation to active operation involves increasing the engine speed ES from its idle operation value IES which is less than the engagement engine speed $ES_{engage}$ to a final value which is slightly greater than the engagement speed $ES_{engage}$. This increase in engine speed ES can be obtained in a much shorter response time by advancing the ignition timing IT than by increasing the throttle valve position TVP. In addition, the response time can be minimized further by minimizing the adjustment of throttle valve position TVP required for transitioning from idle to active operation. The adjustment of the throttle valve 70 is minimized by selecting an idle throttle valve position ITVP that is approximately equal to a throttle valve position TVP that provides an engine speed ES for active operation in the given mode of operation.

Therefore, in order to reduce the sport mode response time compared to the standard mode response time, the sport mode idle throttle valve position $ITVP_{SPORT}$ is increased compared to the standard mode idle throttle valve position $ITVP_{STD}$, and the sport mode idle ignition timing $IIT_{SPORT}$ is retarded compared to the standard mode idle ignition timing IITstd. Retarding the sport mode idle ignition timing $IIT_{SPORT}$ allows idle operation (i.e. idle engine speed less than engagement speed, $IES<ES_{engage}$) of the engine 24 despite the increased sport mode throttle valve position $ITVP_{SPORT}$. Such an adjustment of sport mode idle throttle valve position $ITVP_{SPORT}$ and the sport mode idle ignition timing $IIT_{SPORT}$ also has the desired effect of reducing the sport mode response time.

The economy mode $IES_{ECO}$ is less than the standard mode idle engine speed $IES_{STD}$. The economy mode idle throttle valve position $ITVP_{ECO}$ is smaller than the standard mode idle throttle valve position $ITVP_{STD}$, and the economy mode idle ignition timing is advanced compared to the standard mode idle ignition timing $IIT_{STD}$. It is contemplated that the idle ignition timing IIT could have the same values in the standard and economy modes. It is contemplated that the idle engine speed IES idle throttle valve position ITVP and the idle ignition timing IIT could all have the same values in the standard and economy modes. It is further contemplated that the idle throttle valve position ITVP could have the same values in all three modes, and that the different idle engine speeds of the three modes could be obtained by accordingly adjusting the idle ignition timing.

Figure 4:
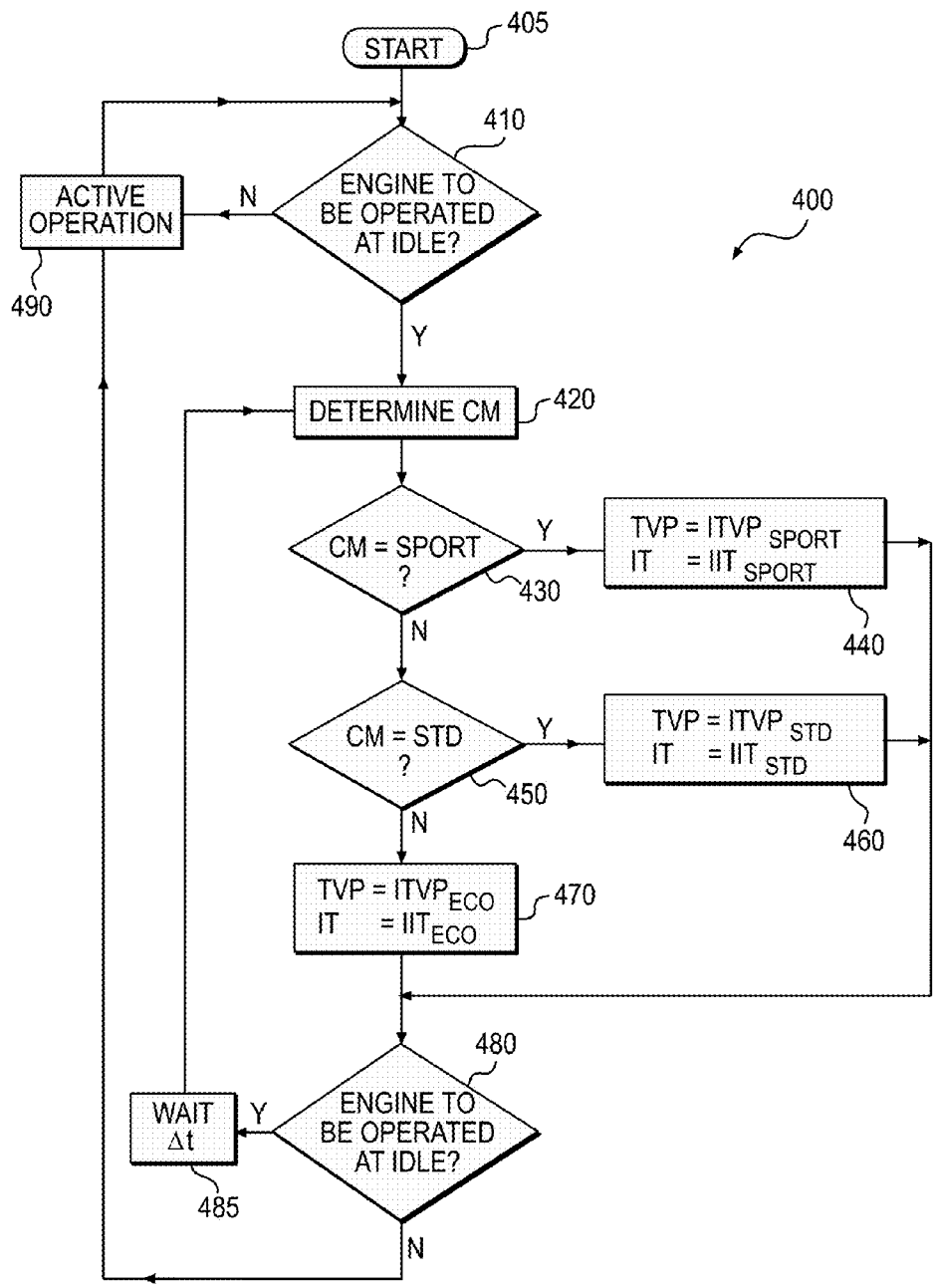
FIG. 4 is a logic diagram illustrating a method of controlling idle operation of an engine of the snowmobile of FIG. 1.

With reference to FIG. 4, the method 400 by which ECU 200 controls idle operation of the engine 24 will now be discussed.

The method 400 starts at step 405 after the engine 24 has been turned on, typically by inserting and/or connecting an electronic and/or a mechanical key and pressing a start button. At step 410, the method 400 determines if the engine 24 is to be operated at idle. In the present embodiment, the ECU determines whether the engine 24 is to be operated at idle based on the position PP of the throttle lever 37. The ECU 200 also assumes that the engine 24 is to be operated in idle at initial startup since the snowmobile 10 of the present embodiment is prevented from startup unless the throttle lever 37 is in its "idle" position farthest from the handlebar 36, i.e. the snowmobile 10 will not be allowed to startup with the throttle lever 37 being pressed. Therefore, in the illustrated embodiment of the method 400, the ECU 200 determines that the engine 24 is to be operated at idle at initial startup of the snowmobile 10, or at a time after startup, if the throttle operator position PP is set to zero.

If the ECU 200 determines that idle operation of the engine 24 is not required, the method 400 proceeds to step 490, continuing the active operation (i.e. non-idle operation) of the engine 24. In active or non-idle operation of the engine 24, the performance of the engine 24, including parameters such as the output power, throttle valve response, and ignition timing, is controlled based on user input from the throttle operator 37, mode switch 62, etc. and algorithms and/or control maps for the current mode of operation CM.

If at step 410, the ECU 200 determines that the engine 24 is to be operated in idle, the method 400 proceeds to step 420 where the ECU 200 determines the current mode of operation CM based on the signal received from the mode switch sensor 210 as described above.

If the current mode of operation CM is determined to be the sport mode at step 430, at step 440, the ECU 200 sets the throttle valve position TVP to $ITVP_{SPORT}$ and the idle ignition timing IT to $IIT_{SPORT}$ for idle operation in the sport mode. The method then proceeds to step 480.

If at step 430, the current mode CM is not the sport mode, the method 400 proceeds to step 450 to determine whether the current operation mode CM is the standard mode. If at step 450, the current mode CM is determined at step 450 to be the standard mode, then at step 460, the throttle valve position TVP is set to $ITVP_{STD}$ and the ignition timing IT is set to $IIT_{STD}$ for idle operation in the standard mode. The method then proceeds to step 480.

The current mode CM is determined to be the economy mode if at step 450, it is determined that CM is not the standard mode. The method 400 then proceeds to step 470 where the ECU 200 sets the throttle valve position TVP to $ITVP_{ECO}$, and the ignition timing IT to $IIT_{ECO}$, for idle operation in the economy mode. The method then proceeds to step 480.

It should be understood that the step 430 can be performed in parallel with step 450, or steps 430 and 450 can be performed in reverse order than as shown in FIG. 4. It should be understood that the ECU 200 could instead determine whether the current mode CM is the standard mode or the economy mode, and if neither then conclude that the current mode CM is the sport mode. Similarly, the ECU 200 could instead determine whether the current mode CM is the sport mode or the economy mode, and if neither then conclude that the current mode CM is the standard mode. The method 400 could also have a single step to determine the current mode CM and then accordingly go to either one of the steps 440, 460 and 470, before proceeding to step 480.

At step 480, the ECU 200 determines whether idle operation of the engine 24 is to be continued. The ECU 200 determines that idle operation of the engine 24 is to be discontinued if the throttle lever 37 is set to a throttle operator position PP greater than zero. If the idle operation of the engine 24 is to be discontinued, the method 400 proceeds to step 490 to commence active operation of the vehicle 10 where the performance of the engine 24 is based on user input and control maps and/or algorithms as explained above. If at step 480, it is determined that the idle operation of the engine is to be continued, the method 400 proceeds to step 485 to wait for a predetermined time period Δt before returning once again to step 420 to determine the current mode of operation CM.

Figure 5:
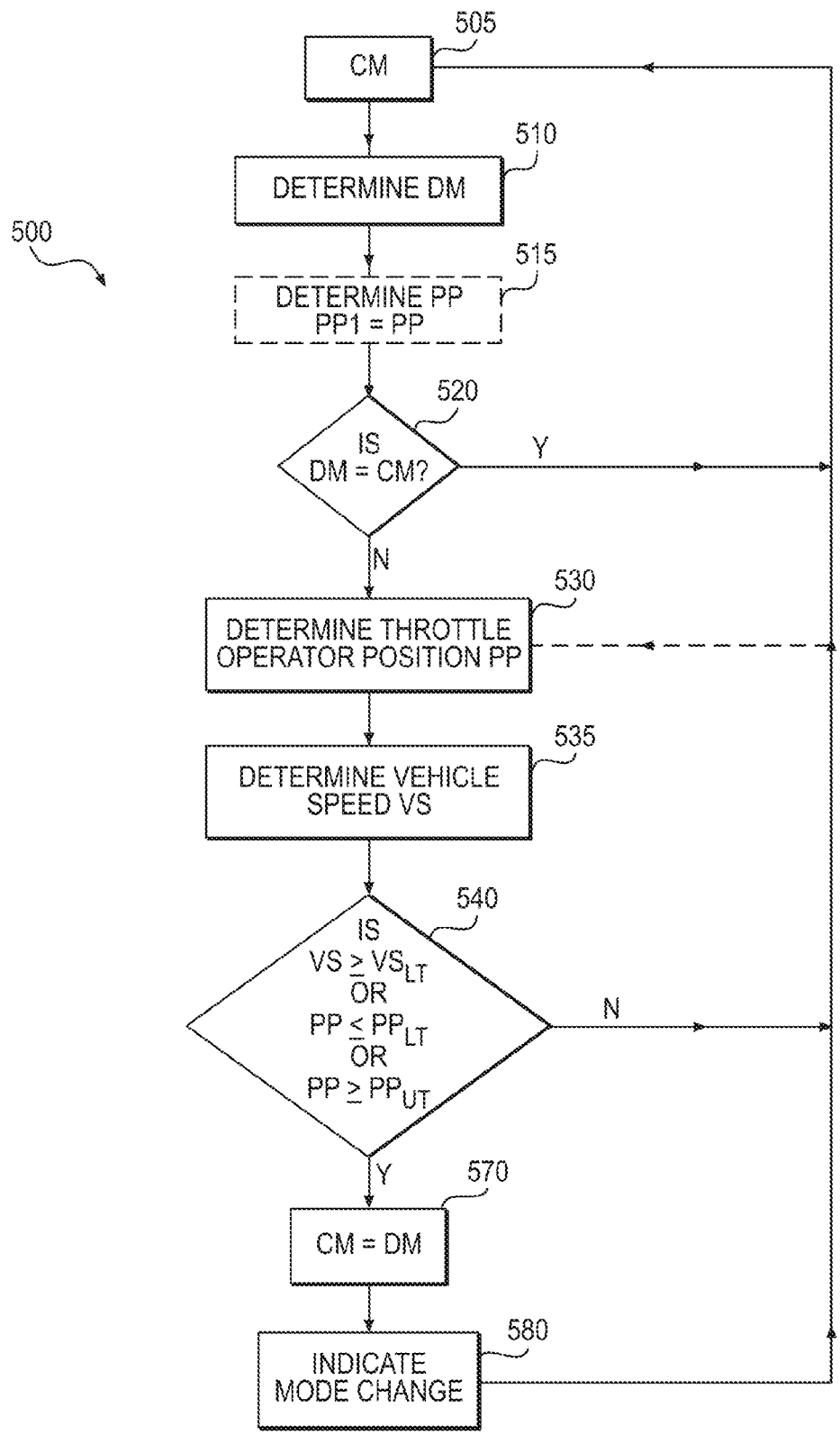
FIG. 5 is a logic diagram illustrating a method of changing a mode of operation of the snowmobile of FIG. 1.

With reference to FIG. 5, a method 500 of changing the mode of operation of the snowmobile 10 will now be described.

The method 500 begins at step 505 where the ECU 200 operates the snowmobile 10 in the current mode CM. At step 510, the ECU 200 determines the desired mode of operation DM based on the signal(s) received from the mode switch sensor 210.

At step 520, the ECU 200 compares the desired mode DM to the current mode of operation CM to determine whether a change of mode of operation has been requested. If the desired mode DM is the same as the current mode CM, indicating that operation of the snowmobile 10 is to be continued in the current mode CM, the method 500 returns to step 505 to continue operation in the current mode CM. If at step 520, DM is determined to be different from CM indicating that a change in the mode of operation of the snowmobile 10 is desired, the method 500 proceeds to step 530 to determine when the operation mode should be changed.

At step 530 the ECU determines the throttle operator position PP based on the signals received from the throttle operator position sensor 204.

At step 535 the ECU determines the vehicle speed VS based on the signals sent by the vehicle speed sensor 202.

At step 540, the ECU 200 determines whether at least one of the throttle operator position PP or the vehicle speed VS is in a range, defined by their respective threshold values, where a change in mode of operation is allowed.

At step 540, the ECU 200 compares the throttle operator position PP to a throttle operator lower threshold position $PP_{LT}$ and a throttle operator upper threshold position, $PP_{UT}$. At step 540, the ECU 200 also compares the vehicle speed VS to a vehicle speed lower threshold $VS_{LT}$. If the ECU 200 determines that throttle operator position PP is less than or equal to the lower threshold position $PP \leq PP_{LT}$, the method proceeds to step 570 to change the mode of operation. Alternatively, if the throttle operator position PP is greater than or equal to the upper threshold position $PP \geq PP_{UT}$, the method proceeds to step 570 to change the mode of operation. Alternatively, the method also proceeds to step 570 to change the mode of operation if, at step 540, the vehicle speed VS is determined to be greater than, or equal to, the lower threshold $VS \geq VS_{LT}$.

If at step 540, the throttle operator position PP is determined to be less than the upper threshold $PP_{UT}$, and greater than the lower threshold position $PP_{LT}$, and additionally that the vehicle speed VS is determined to be less than the vehicle speed lower threshold $VS_{LT}$, the mode of operation is not changed immediately and the method 500 returns to step 505 to continue operation in the current mode CM. In some embodiments, the method 500 waits until one of the conditions of step 540 is satisfied before changing the mode of operation. In this case, the method returns to step 530 (as shown by the dotted line), instead of step 505 to continue to monitor the throttle operator position PP and the vehicle speed VS, so that the mode can be changed when one of the conditions in step 540 is satisfied. In some embodiments, the method 500 will wait for a predetermined amount of time for the throttle operator PP and/or vehicle speed VS to change so as to satisfy conditions of step 540. The method 500 could optionally include a step where the ECU 200 sends a signal to the display cluster 64 to display an appropriate message/indication (for example, by means of a blinking light or icon, a text message or the like) as an indication to the driver of the snowmobile that the mode has not been changed yet. The indicator could be updated (for example, the blinking light could stop blinking and be continuously on/off) to indicate either that the mode change has been completed, or timed out (greater than predetermined amount of time has passed without the conditions of step 540 being satisfied).

As would be understood by a person skilled in the art, the mode change from one mode to another is effected without requiring that the throttle operator position PP be at a position PP corresponding to an idle throttle valve position ITVP. In other words, the mode can be changed while the vehicle 10 is in active operation and the engine 24 is supplying torque to propel the vehicle 10 forward.

In some embodiments, the method 500 compares the throttle operator position to a second lower threshold position $PP_{LT2}$ which is greater than zero and less than the lower threshold position $PP_{LT}$. The method 500 will change the mode only if the throttle operator position PP is greater than this second threshold throttle position $PP_{LT2}$.

It is contemplated that the ECU 200 could determine the throttle valve position TVP and change the mode of operation if the throttle valve position TVP is greater than the idle throttle valve position ITVP for the current mode of operation. It is contemplated that there could also be threshold throttle valve positions to define the conditions for allowing changes of modes of operation.

It is also contemplated that the method 500 could have an additional step 515 of determining the throttle operator position PP. Step 540 could have an addition comparison (not shown) between this initial value PP1 of throttle operator position to the throttle operator position PP determined at step 520, and permit a change in mode of operation even if the PP is greater than the earlier position PP1. Thus, the mode of operation can be changed even if the vehicle 10 is accelerating.

At step 570, the ECU 200 sets the current mode CM to the desired mode DM, (i.e. CM=DM). The ECU 200 accesses the control maps and algorithms specific to the new mode DM. In addition, at step 580, the ECU 200 sends a signal to the display cluster 64 in order to display an indication that the mode has been changed. The method 500 then returns to step 505 to operate the engine 24 in the new mode DM.

When the mode of operation is changed, the throttle response curve 102, 104, 106 used by the ECU 200 to control the throttle valve 70 also changes. As can be seen in FIG. 6A, there could be significant differences between the throttle valve positions TVP of different modes corresponding to the same throttle operator position PP. The change in mode of operation therefore entails changing the throttle valve position TVP from an initial (current mode) throttle valve position TVP to a final (desired mode) throttle valve position TVP. The final throttle valve position depends on whether or not the throttle operator position PP is being changed by the driver of the snowmobile 10 while the change in mode is being effected.

With reference to FIG. 6A, the transitions 110, 112 illustrate a change in the mode of operation while the throttle operator position PP is changing. The transition 110 represents a transition from the economy to the standard modes of operation, or vice versa. The transition 112 illustrates a transition from the standard to the sport modes of operation, or vice versa. It is also contemplated that the driver of the snowmobile 10 could maintain the throttle lever 37 in a constant position while requesting a change in mode of operation from the current mode CM to a desired mode DM. The transitions 110', 112' respectively illustrate transitions between the economy and standard modes and vice versa, and between the standard and sport modes and vice versa, with the throttle lever position PP maintained in a constant position during the mode change.

Figure 6B:
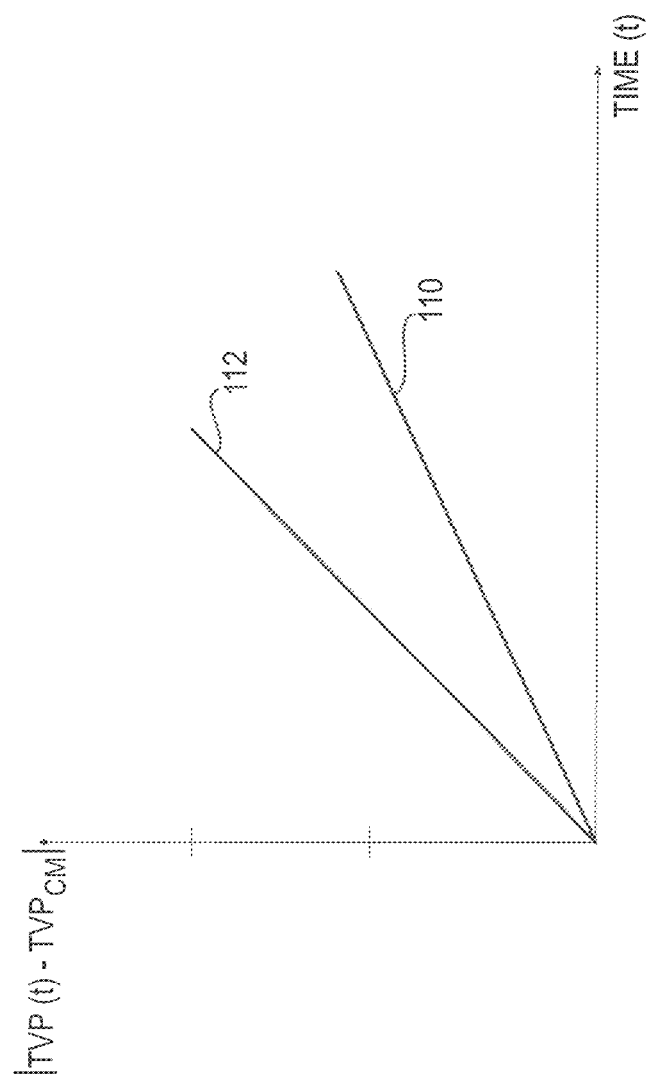
FIG. 6B illustrates a change of throttle valve position as a function of time during a transition from one mode of operation to another mode of operation.

In all of the above situations, the operation mode is changed from the current mode CM to the desired mode DM such that the throttle valve position TVP changes from the initial (current mode) throttle valve position $TVP_{CM}$ to the final (desired mode) throttle valve position $TVP_{DM}$ gradually and continuously as a function of time as shown in FIG. 6B, rather than in one abrupt and discontinuous step. The change of mode of operation thus takes a finite amount of time that depends on the transition rate and the particular values of the initial and final throttle valve positions TVP, and optionally on the initial and final throttle operator positions PP.

The ECU 200 controls the transition from the current mode CM to that of the desired mode DM of operation based on predetermined algorithms. FIG. 6B shows an example of the change in throttle valve position TVP as a function of time for the transition 110 between the economy and standard modes, and for the transition 112 between the standard and sport modes. The transition rate is expressed in % per second and defined as the change in the throttle valve position TVP as a function of time. The instantaneous change in throttle valve position TVP is the difference between the throttle valve position at a given time TVP(t) and the initial throttle valve position $TVP_{CM}$. The transition rate of the transition 110 between the economy mode and the standard mode is different compared to the transition rate of the transition 112 between the standard and sport modes.

In the illustrated embodiment, the transition rate does not depend on the direction of the transition 110, 112. It is contemplated that the transition rate of the transitions 110, 112 could also depend on the direction of the transition 110 or 112. Thus, the transition rate for an "up" transition (i.e. from economy to standard for the transition 110, and from standard to sport for the transition 112) could be different than the transition rate for the corresponding "down" transition (i.e. from sport to standard for the transition 112, and from standard to economy for the transition 110).

In the illustrated embodiment, a change in operation mode is allowed only in single steps, i.e. from economy to standard mode and vice versa, and from standard to sport mode and vice versa. It is contemplated that a change in mode of operation could also be allowed from sport to economy and/or vice versa. It is further contemplated that the transition rate for a change in mode of operation between sport and economy modes could be greater or smaller than the transition rate of the transitions 110, 112.

When the initial current mode throttle valve position $TVP_{CM}$ is the same as the final desired mode throttle valve position $TVP_{DM}$, such as for a transition (not shown) at 108 in FIG. 6A between the standard and sport modes with the throttle lever 37 being maintained at a constant throttle operator position PP of 100%, the change in the mode of operation from the current mode CM to the desired mode DM is effected immediately, as a change of throttle valve position, as shown in FIG. 6B, is not required.

It is also contemplated that, for some transitions, the driver of the snowmobile 10 could additionally be required to change the throttle operator position PP. The throttle responses 102, 104, 106 and the transitions 110, 112, 110', 112' therebetween, as shown in FIGS. 6A and 6B respectively, are intended to be exemplary only and the present is not limited to the responses shown therein.

The operation of the snowmobile 10 in different modes can also be based on the information encoded in the security system key 234. In addition to the identification information mentioned above, the key 234 can also include operational parameters for the operation of the snowmobile 10.

With reference to FIG. 7B, in one embodiment of the vehicle 10, the vehicle 10 is provided with multiple keys 234, 234' 234", each being respectively attached to a corresponding lanyard 236, 236' 236" as can be seen in FIG. 7B. Each key 234, 234' 234" is encoded with information for limiting certain parameters such as vehicle speed VS, engine torque, and the like, to adapt the snowmobile characteristics for different drivers having different keys 234, 234' 234". When a key 234, 234' 234" is placed in the key receiver 232, and if the key 234, 234' 234" is determined to be authorized, the ECU 200 retrieves information, such as limiting parameters, and/or a key description, related to the operation of the vehicle 10 and controls operation of the vehicle 10 accordingly.

For example, a first key 234 could be a standard key with no limitations being applied to any of the standard vehicle characteristics, such as the vehicle speed and throttle valve opening TVP. A driver operating the snowmobile 10 using a standard key 234 would be allowed to operate the snowmobile 10 in any of two or more different modes, such as the SPORT, STD, and ECO modes, and the relationship of the throttle valve position TVP as a function of the throttle operator position PP would be that shown in FIG. 6, for example.

The vehicle could also be provided with a second key 234' which could be encoded to limit the maximum vehicle speed VS, for example to a maximum of 70 km/h. A third key 234" could be encoded with a different maximum vehicle speed VS, for example, 40 km/h. Keys 234', 234" having such limits associated therewith could be referred to herein as "learning keys".

The vehicle speed VS can be limited by limiting the engine output torque, which in turn can be limited by limiting the throttle valve position TVP to a value less than 100%. The maximum throttle valve position TVP could be limited to a value that provides sufficient engine torque to propel the vehicle 10 forward on flat level ground at the maximum speed VS associated with the given learning key 234', 234". For example, for a particular vehicle 10 operated using a learning key 234', the maximum throttle valve position TVP is set to be 75% to limit the speed below 70 km/hr.

Figure 9:
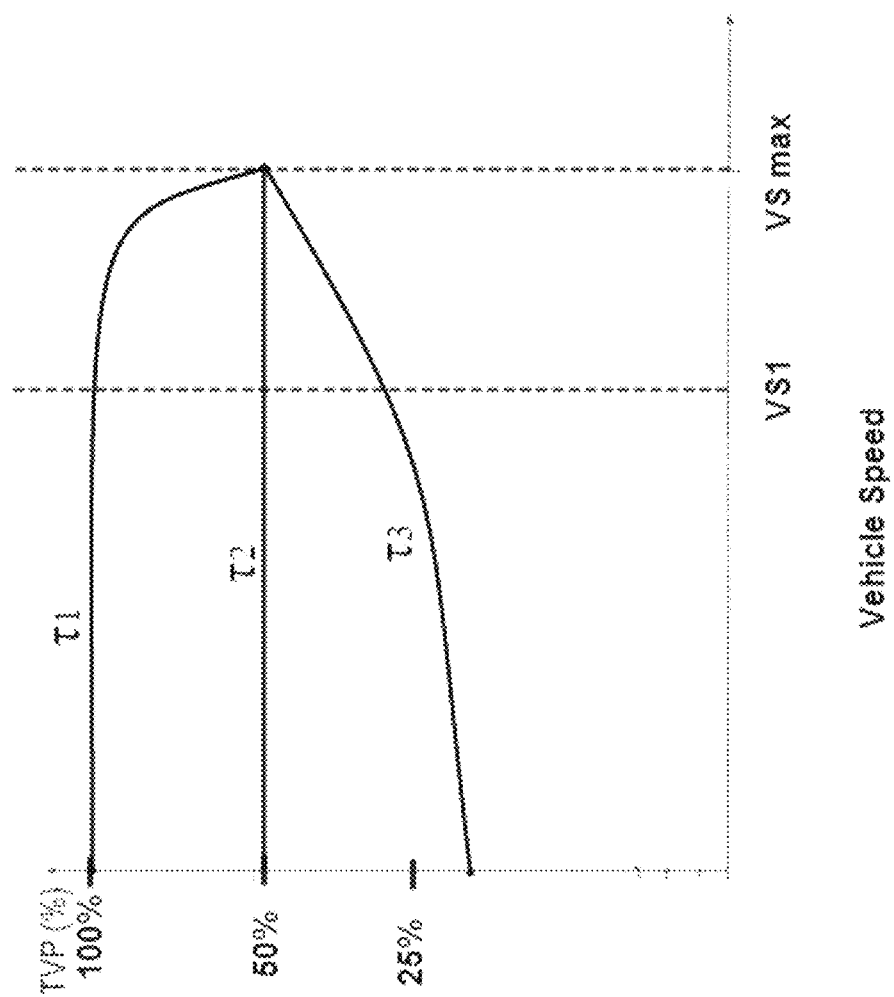
FIG. 9 is an illustration of three different relationships of the throttle valve position as a function of the vehicle speed for the snowmobile of FIG. 1 being operated using three different learning keys and illustrating a torque limiting for each of the learning keys.

As shown in FIG. 9, a learning key 234', 234" can also be encoded so as to limit or otherwise control the acceleration of a vehicle 10 when it is being operated with a learning key 234', 234". The acceleration of the vehicle 10 can be controlled by controlling the engine output torque. The vehicle 10 could have different engine toque settings corresponding to different acceleration settings.

With reference to FIG. 9, a first learner key torque setting τ1 allows the vehicle 10 to have similar acceleration as when the vehicle 10 is being operated with a standard key 234 (i.e. 100% throttle operator position PP=will result in a 100% throttle valve position TVP), but only until a certain vehicle speed VS1, is reached, at which point the ECU 200 will limit the throttle valve opening TVP (even if the throttle operator position PP remains at 100%) to a throttle valve position TVP that maintains the vehicle 10 at the maximum vehicle speed VS for the particular learning key 234', 234" being used. This torque/acceleration control allows the user, using a learning key 234', 234", to achieve a high acceleration while still being limited to a maximum vehicle speed VS. This type of torque/acceleration control may be suitable, for example, for an intermediate rider.

With reference to FIG. 9, the vehicle 10 is provided with another learner key torque setting τ2 in which the vehicle 10 is limited to the same maximum vehicle speed VS as in the learner key torque setting τ1, however, the acceleration is limited to a value below that of the learner key torque setting τ1. Thus, in the learner key torque setting τ2, the throttle valve position TVP is controlled to increase at a relatively constant rate but is limited to a lower maximum throttle valve opening TVP, so as to provide a smaller acceleration, than that provided with the learner key torque setting τ1.

Still referring to FIG. 9, in the illustrated embodiment, the vehicle 10 is provided with another learner key torque setting τ3, in which the vehicle 10 is limited to the same maximum vehicle speed VS as in the learner key torque settings τ1 and τ2, but the vehicle 10 is limited to a smaller acceleration than that in the learner key torque settings τ1 and τ2.

For simplicity, in FIG. 9, all three learner key torque setting curves τ1, τ2, τ3 are shown as if the throttle operator position PP is set to 100% throughout the acceleration process. If the actual throttle operator position PP set by the driver is at a value less than 100% during acceleration, then the corresponding throttle valve position TVP will be set to that which corresponds to the instantaneous throttle operator position PP until the maximum allowed vehicle speed VS1 speed is reached, at which point, the ECU 200 will either reduce the throttle valve opening TVP, or maintain the throttle valve opening TVP at its current level in order to maintain the vehicle speed VS at the maximum allowed speed VS1 even if the driver of the vehicle 10 continues to increase the throttle operator position PP. In all three learner key torque settings τ1, τ2, τ3 discussed above, the maximum torque output is limited at some point as the vehicle speed is accelerating from 0 to the maximum allowed vehicle speed VS1.

Figure 8A:
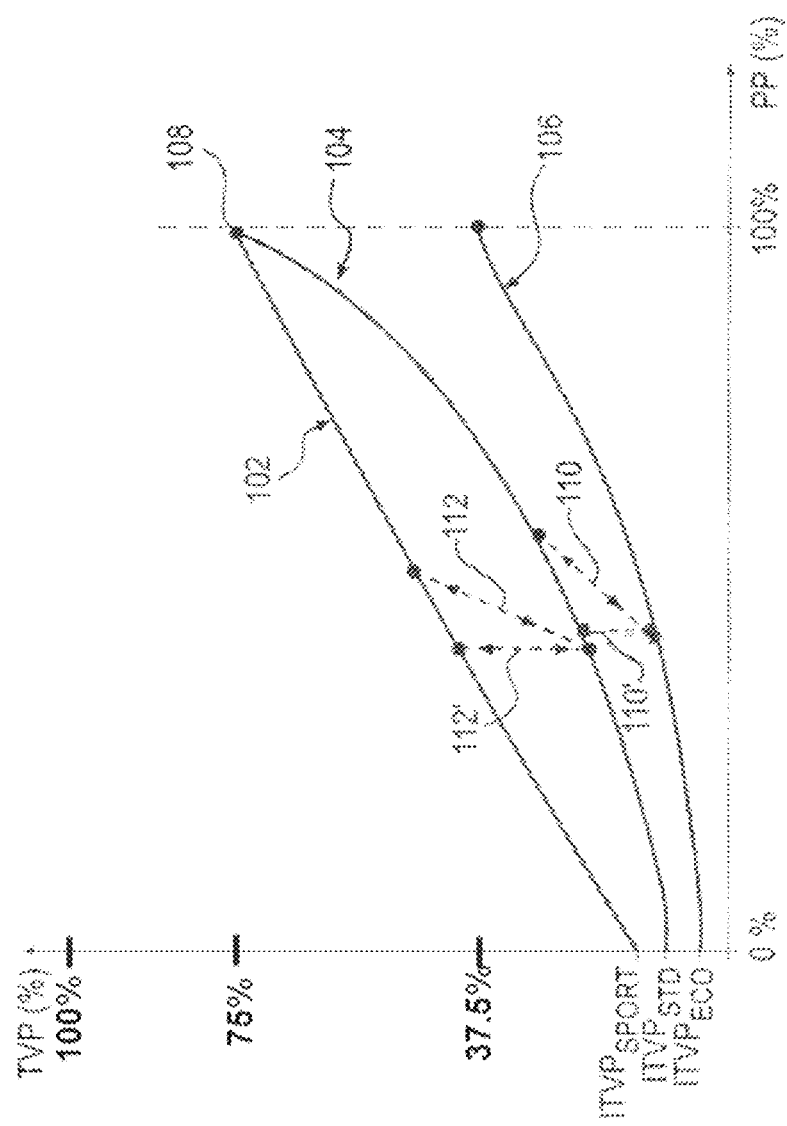
FIG. 8A is an illustration of the response of a throttle valve to a position of a throttle operator in different modes of operation of the snowmobile of FIG. 1 and when using a first one of the learning keys of the security system of FIG. 7B.
Figure 8B:
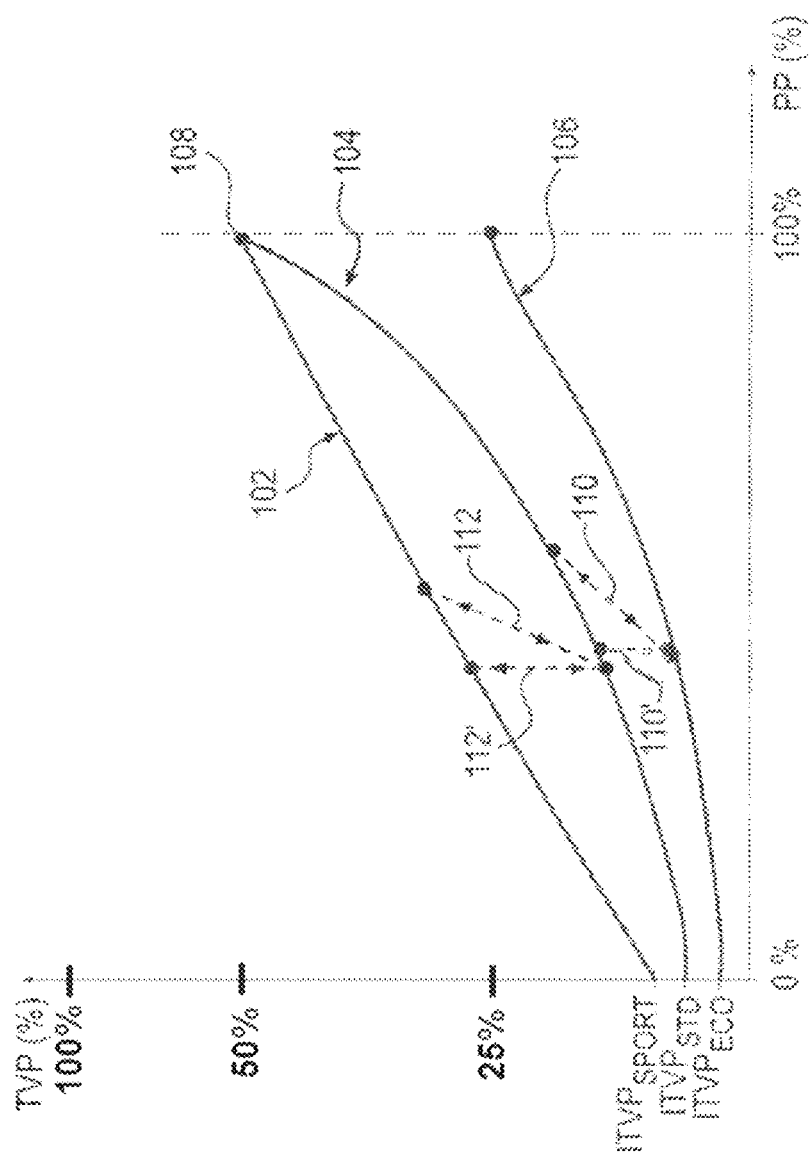
FIG. 8B is an illustration of the response of a throttle valve to a position of a throttle operator in different modes of operation of the snowmobile of FIG. 1 and when using the second one of the learning keys of the security system of FIG. 7B.

With reference to FIGS. 8A and 8B, the learning keys 234', 234" would allow the driver to operate the vehicle 10 in two or more different driving modes, such as SPORT, STD or ECO modes. This allows the driver using the learning keys 234', 234" to have personal control even though certain parameters are limited to a reduced level compared to that for a driver using a standard key 134. For a driver using the learning key 234', 234", each mode would have a similar relationship between the throttle operator position PP and the throttle valve position TVP as a driver using a standard key 234 (shown in FIG. 6A), except that the throttle valve position TVP for any given throttle operator position PP would be scaled by the maximum throttle valve position TVP limit associated with the particular key 234', 234".

Thus, using the example of the learning key 234' from above, as can be seen in FIG. 8A, when a driver using the learning key 234' changes the throttle operator position PP from 0% to 100% in the SPORT mode, the throttle valve position TVP changes from the idle throttle valve position ITVP$_{SPORT}$ to 75%. In the ECO mode, when using a standard key 234, the throttle valve opening is limited to 50% as can be seen in FIG. 6A. When using the learning key 234', in the ECO mode, the throttle valve opening TVP changes from the idle throttle valve position ITVP$_{ECO}$ to 37.5% With reference to FIG. 8B, when a driver using the learning key 234" changes the throttle operator position PP from 0% to 100% in the SPORT mode, the throttle valve position TVP changes from the idle throttle valve position ITVP$_{SPORT}$ to 50%. When using the learning key 234", in the ECO mode, the throttle valve opening TVP changes from the idle throttle valve position ITVP$_{ECO}$ to 25%. It should be understood that the values listed herein are exemplary only, and the learning keys 234', 234" could be limited to a vehicle speed VS and throttle valve position TVP that is different from that discussed herein.

As should be appreciated, a learning key 234', 234" can be identified and associated with different operational parameters such as maximum vehicle speed, maximum acceleration and the like, which cannot be altered when using the learning key 234', 234" itself, but rather only when using the standard key 234.

It is contemplated that the limiting operational parameters, such as maximum vehicle speed VS, maximum engine output torque, and the like, associated with a learning key 234', 234" could be stored on the ECU 200 instead of the learning key itself 234', 234". It is also contemplated that the limiting parameters associated with a learning key 234', 234" could be alterable by the ECU 200 so as to avoid the need for multiple learning keys 234', 234". In one embodiment, the limit(s) associated with the learning key 234' are altered by the following steps: Pressing the start-up switch 220 to initialize and wake-up the electrical system; placing the standard key 234 on the key receiver 232 and altering the limiting parameter(s) that were previously saved in the ECU 200 using a user input such as select and mode buttons provided with the display cluster. It is contemplated that a different series of steps, or user input could be used to enter and save the limiting parameters on the ECU 200. Once the new parameter for the learning key 234' have been saved on the ECU 200, and when the standard key 234 is removed and replaced with the learning key 234' on the key receiver 232, the ECU 200 recognizes it as a learning key 234' and uses the new limiting parameters for operation of the vehicle 10. The ECU 200 is configured to not allow a driver of the vehicle 10 using a learning ley 234' to alter the limiting parameters, and the learning key 234' cannot be reprogrammed to be a standard key 234. Thus, the limiting parameters for the maximum engine torque, maximum vehicle speed VS, and the like associated with the learning key 234' remain lower than those of the standard key 234.

Figure 10:
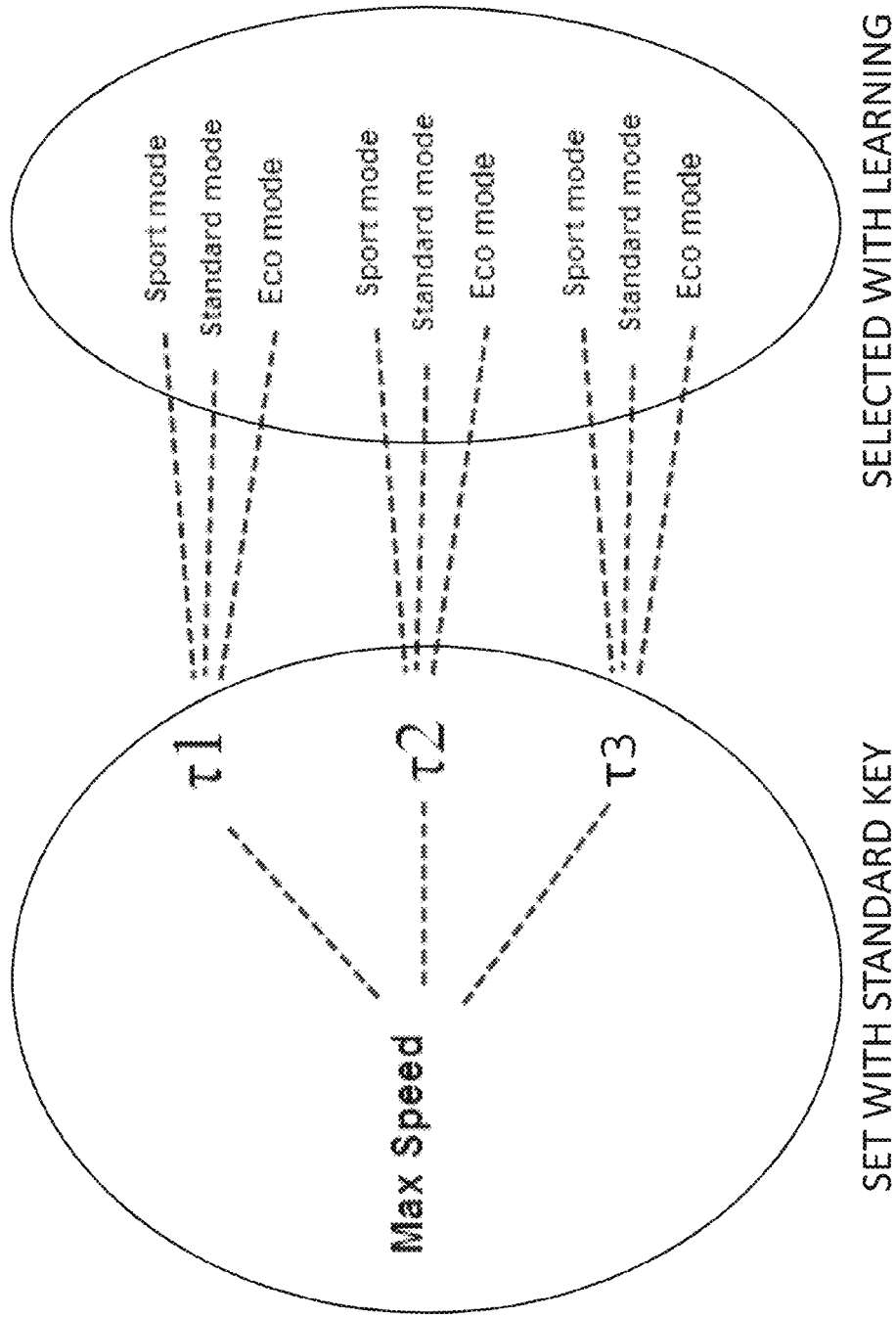
FIG. 10 is a schematic illustration of the selection and setting of operational parameters for vehicle operation using the learning key.

FIG. 10 shows schematically the selection and setting of operational parameters for vehicle operation using the learning key 234', 234". As can be seen, the maximum vehicle speed VS1 is first set, after which the learning key torque setting is selected to be one of the three settings τ1, τ2, τ3. In the illustrated embodiment, the vehicle 10 is provided with three different torque settings τ1, τ2, τ3 but it is contemplated that the vehicle 10 could allow two or more than three different torque settings. The setting of the learning key maximum vehicle speed VS1 and the learning key torque setting can only be done with a standard key 234 being placed on the key receiver 232. A driver using the learning key 234', 234" however is free to select the mode of operation (SPORT, STD, ECO in the illustrated embodiment) and change from one mode to another according to their preference.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of operating a vehicle comprising an engine, the method comprising:
   determining if the engine is to be operated at idle;
   determining a current mode of operation of the vehicle, the current mode of operation being any one of a plurality of modes of operation, each of the plurality of modes of operation of the vehicle including a corresponding active operation of the engine and a corresponding idle operation of the engine, the plurality of modes of operation including at least a first mode and a second mode; and
   if the engine is determined to be operated at idle:
      operating the engine at a first idle speed if the current mode of operation of the vehicle is the first mode of operation; and
      operating the engine at a second idle speed if the current mode of operation of the vehicle is the second mode of operation,
      the first idle speed being greater than the second idle speed.

2. The method of claim 1, wherein the engine is connected to a throttle body, the throttle body including a throttle valve, the throttle valve being movable between a plurality of throttle valve positions, each throttle valve position corresponding to a degree of opening of the throttle valve; and
   wherein:
   operating the engine at the first idle speed comprises:
      operating the engine with a first ignition timing, and positioning the throttle valve at a first throttle valve position; and
   operating the engine at the second idle speed comprises:
      operating the engine with a second ignition timing, and positioning the throttle valve at a second throttle valve position,
   the first ignition timing being retarded with respect to the second ignition timing, and
   the degree of opening of the throttle valve corresponding to the first throttle valve position being greater than the degree of opening of the throttle valve corresponding to the second throttle valve position.

3. The method of claim 1, wherein:
   the engine is operatively connected to a continuously varying transmission (CVT), the CVT having an engagement speed;
   the first idle speed of the engine is less than the engagement speed; and
   the difference between the first idle speed and the engagement speed is less than the difference between the first idle speed and the second idle speed.

4. The method of claim 1, further comprising:
   determining a desired mode of operation, the desired mode of operation being any one of the plurality of modes including the first mode and the second mode;
   comparing the desired mode of operation to the current mode of operation of the vehicle; and
   if the desired mode of operation is different from the current mode of operation of the vehicle:
      determining a throttle operator position;
      determining a vehicle speed; and
      changing the current mode of operation of the vehicle from the current mode of operation to the desired mode of operation, based at least in part on the throttle operator position and the vehicle speed.

5. The method of claim 4, wherein the step of changing the current mode of operation comprises changing the current mode of operation of the vehicle if any one of the following conditions is satisfied:
   the vehicle speed is greater than a vehicle speed threshold;
   the throttle operator position is less than a throttle operator lower threshold position; and
   the throttle operator position is greater than a throttle operator upper threshold position.

6. The method of claim 5, further comprising:
   indicating to an operator of the vehicle a status update of changing the current mode of operation.

7. The method of claim 5, further comprising:
   continuing operation of the vehicle in the current mode of operation if all of the following conditions are unsatisfied:
      the vehicle speed is greater than the vehicle speed threshold;
      the throttle operator position is less than the throttle operator lower threshold position; and
      the throttle operator position is greater than the throttle operator upper threshold position;
   and
   changing the current mode of operation of the vehicle from the current mode of operation to the desired mode of operation at a time when any one of the following conditions is satisfied:
      the vehicle speed is greater than the vehicle speed threshold;
      the throttle operator position is less than the throttle operator lower threshold position; and
      the throttle operator position is greater than the throttle operator upper threshold position.

8. The method of claim 5, wherein the throttle operator lower threshold position is 5% of a maximum throttle operator position for the current mode operation of the vehicle.

9. The method of claim 5, wherein the throttle operator upper threshold position is 86% of a maximum throttle operator position for the current mode operation of the vehicle.

10. The method of claim 4, wherein the engine is connected to a throttle body, the throttle body including a throttle valve, the throttle valve being movable between a plurality of throttle valve positions, and wherein changing the current mode of operation from the current mode of operation to the desired mode of operation comprises changing at least one of:
a maximum output power of the engine;
a maximum throttle valve position of the throttle valve; and
a throttle valve response of the throttle valve position as a function of a throttle operator position.

11. The method of claim 10, wherein the maximum throttle valve position of the second mode is one of less than and equal to the maximum throttle valve position of the first mode.

12. The method of claim 11, wherein the maximum throttle valve position of the second mode is 50% of the maximum throttle valve position of the first mode.

13. The method of claim 10, wherein:
the plurality of modes of operation of the vehicle further comprises a third mode of operation;
the current mode of operation is any one of the first mode, the second mode and the third mode of operation;
the desired mode of operation is any other one of the first mode, the second mode and the third mode operation; and
wherein:
the maximum throttle valve position of the second mode is one of less than and equal to the maximum throttle valve position of the first mode; and
the maximum throttle valve position of the third mode is less than the maximum throttle valve position of the second mode.

14. The method of claim 10, wherein modifying the throttle valve response as a function of the throttle operator position comprises:
a change of the throttle valve position as a function of time.

15. The method of claim 14, wherein a transition rate of the change of the throttle valve position as a function of time is the same for a transition from the first mode to the second mode as for a transition from the second mode to the first mode.

16. The method of claim 14, wherein:
the plurality of modes of operation of the vehicle further comprises a third mode of operation;
the current mode of operation is any one of the first mode, the second mode and the third mode of operation;
the desired mode of operation is any other one of the first mode, the second mode and the third mode operation; and
wherein:
a transition rate of the change of the throttle valve position as a function of time is greater for a transition between the first mode and the second mode than for a transition between the second mode and the third mode.

17. A method of operating a vehicle comprising an engine, the method comprising:
determining a current mode of operation of the vehicle, the current mode of operation being any one of a plurality of modes of operation, the plurality of modes of operation including at least a first mode and a second mode; and
determining a desired mode of operation, the desired mode of operation being any one of the plurality of modes including the first mode and the second mode;
comparing the desired mode of operation to the current mode of operation of the vehicle; and
if the desired mode of operation is different from the current mode of operation of the vehicle:
determining a throttle operator position; and
changing the current mode of operation of the vehicle from the current mode of operation to the desired mode of operation if the throttle operator position is greater than a throttle operator lower threshold position.

18. The method of claim 17, further comprising:
determining a vehicle speed; and
changing the current mode of operation of the vehicle from the current mode of operation to the desired mode of operation if the vehicle speed is greater than a vehicle speed threshold.

19. A method of operating a vehicle comprising an engine, the method comprising:
determining a current mode of operation of the vehicle, the current mode of operation being any one of a plurality of modes of operation, the plurality of modes of operation including at least a first mode and a second mode;
determining a desired mode of operation, the desired mode of operation being any one of the plurality of modes including the first mode and the second mode;
comparing the desired mode of operation to the current mode of operation of the vehicle; and
changing the current mode of operation of the vehicle from the current mode of operation to the desired mode of operation while a throttle operator position is greater than a position corresponding to an idle throttle valve position.

20. The method of claim 19, further comprising:
determining a first throttle operator position prior to comparing the desired mode of operation to the current mode of operation of the vehicle;
determining a second throttle operator position after comparing the desired mode of operation to the current mode of operation of the vehicle; and
changing the current mode of operation of the vehicle from the current mode of operation to the desired mode of operation if the second throttle operator position is greater than the first throttle operator position.

* * * * *